United States Patent
Yu

(10) Patent No.: US 12,164,555 B2
(45) Date of Patent: Dec. 10, 2024

(54) INTERACTIVE METHOD AND SYSTEM OF BULLET SCREEN EASTER EGGS

(71) Applicant: Shanghai Bilibili Technology Co., Ltd., Shanghai (CN)

(72) Inventor: Lulu Yu, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 173 days.

(21) Appl. No.: 17/222,107

(22) Filed: Apr. 5, 2021

(65) Prior Publication Data

US 2021/0342385 A1 Nov. 4, 2021

(30) Foreign Application Priority Data

Apr. 30, 2020 (CN) .......................... 202010362837.6

(51) Int. Cl.

| | |
|---|---|
| *G06F 16/48* | (2019.01) |
| *G06F 16/435* | (2019.01) |
| *G06F 16/58* | (2019.01) |
| *G06F 40/134* | (2020.01) |
| *G06F 40/30* | (2020.01) |
| *G06N 20/00* | (2019.01) |

(52) U.S. Cl.
CPC .......... *G06F 16/489* (2019.01); *G06F 16/437* (2019.01); *G06F 16/5866* (2019.01); *G06F 40/134* (2020.01); *G06F 40/30* (2020.01); *G06N 20/00* (2019.01)

(58) Field of Classification Search
CPC .... G06F 40/169; G06F 16/7867; G06F 16/78; G06F 16/489; G06F 16/3326; G06F 16/3346; G06F 40/134; G06F 40/30; G06F 16/437; G06F 16/5866; G06N 20/00

See application file for complete search history.

(56) References Cited

U.S. PATENT DOCUMENTS

| | | | | |
|---|---|---|---|---|
| 2005/0156947 | A1* | 7/2005 | Sakai ................... | G06F 40/109 345/629 |
| 2008/0239365 | A1* | 10/2008 | Salgado ................ | G06F 3/1284 358/1.15 |

(Continued)

FOREIGN PATENT DOCUMENTS

| | | |
|---|---|---|
| CN | 105898600 A | 8/2016 |
| CN | 106303735 A | 1/2017 |

(Continued)

*Primary Examiner* — Wilson W Tsui
(74) *Attorney, Agent, or Firm* — BakerHostetler

(57) ABSTRACT

The embodiment of the present application provides an interactive method of bullet screen easter eggs, including: obtaining information sent by a client when playing a multimedia file, wherein the information comprises comment content and comment time; determining a target interface element for replacing the comment content; determining a timestamp of the target interface element according to the comment time; generating bullet screen data comprising the target interface element and the timestamp; and sending the bullet screen data to the client for displaying the target interface element in a form of a bullet screen on a playback interface of the multimedia file when the multimedia file is played to a time point that matches the timestamp of the target interface element.

20 Claims, 16 Drawing Sheets

(56) References Cited

U.S. PATENT DOCUMENTS

| | | | |
|---|---|---|---|
| 2009/0327855 A1* | 12/2009 | Le | G06F 16/9558 715/230 |
| 2010/0017294 A1* | 1/2010 | Mancarella | H04L 51/063 705/14.55 |
| 2011/0173214 A1* | 7/2011 | Karim | G06F 16/435 707/754 |
| 2013/0145248 A1* | 6/2013 | Friedlander | G06Q 10/107 715/230 |
| 2014/0156762 A1* | 6/2014 | Yuen | H04L 51/063 709/206 |
| 2014/0337126 A1* | 11/2014 | Ohanyan | G06Q 30/0251 705/14.49 |
| 2014/0358680 A1* | 12/2014 | Jones | G06Q 30/0275 705/14.54 |
| 2016/0307344 A1 | 10/2016 | Monnier et al. | |
| 2017/0234659 A1 | 8/2017 | Amidon et al. | |
| 2017/0330227 A1* | 11/2017 | Hicken | G06Q 30/0251 |
| 2018/0004718 A1* | 1/2018 | Pappu | H04L 51/216 |
| 2018/0020793 A1 | 1/2018 | Rao et al. | |
| 2018/0293278 A1* | 10/2018 | Kapoor | G06F 40/30 |
| 2019/0163703 A1* | 5/2019 | Goikhman | H04N 21/23418 |
| 2019/0200078 A1* | 6/2019 | Bhattacharya | H04N 21/4532 |
| 2020/0162796 A1* | 5/2020 | Azuolas | H04L 65/65 |
| 2020/0320112 A1* | 10/2020 | Bansal | G06F 16/45 |
| 2021/0124479 A1* | 4/2021 | Atieh | G06F 21/31 |
| 2022/0377403 A1* | 11/2022 | Lu | H04N 21/4312 |

FOREIGN PATENT DOCUMENTS

| | | |
|---|---|---|
| CN | 108566565 A | 9/2018 |
| CN | 110198477 A | 9/2019 |
| CN | 110351596 A | 10/2019 |

* cited by examiner

INTERACTIVE METHOD AND SYSTEM OF BULLET SCREEN EASTER EGGS

CROSS-REFERENCE TO RELATED APPLICATION

The present invention claims priority of Chinese patent application No. 202010362837.6 with a title "interactive method and system of bullet screen easter eggs" filed on Apr. 30, 2020. The entire content of the above-identified application is incorporated in the present invention by reference.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

SUMMARY

The purpose of the embodiment of the present application is to provide an interactive method and system of bullet screen easter eggs, computing device, and computer-readable storage medium, which aims to improve the interactive effect between users in the way of bullet screen easter eggs, and optimize the display effect of bullet screen and the efficiency of human-computer interaction.

one aspect of the embodiment of the present application provides an interactive, comprising: obtaining data sent from a client computing device while the client computing device is playing a multimedia file, wherein the data comprise information indicative of comment content and comment time; determining a target interface element based at least in part on the comment content; determining a timestamp of the target interface element based on the comment time; generating bullet screen data, the bullet screen data comprising the target interface element and the timestamp; and sending bullet screen data to the client computing device for displaying the target interface element in a form of a bullet screen on a playback interface of the multimedia file when the multimedia file is played to a time point that matches the timestamp of the target interface element.

One aspect of the embodiment of the present application also provides a computing system, which comprises at least one memory, at least one processor, and the at least one memory storing instructions that upon execution by the at least one processor cause the system to perform the operations included in the above-mentioned interaction method.

One aspect of the embodiment of the present application also provides a computer-readable storage medium, which stores a computer program, the computer program can be executed by at least one processor, to cause the at least one processor to implement the operations included in the above-mentioned interaction method of bullet screen easter eggs.

The interactive method and system of bullet screen easter eggs, computing device, and computer-readable storage medium provided by the embodiments of the present application convert the comment content provided by the user into a certain surprise or unexpectedness or interactive bullet screen easter egg, and display the bullet screen easter egg on the playback interface of the multimedia file, so as to improve the interaction effect between users based on the bullet screen easter egg, and optimize the bullet screen display effect and the efficiency of human-computer interaction.

DETAILED DESCRIPTION OF ILLUSTRATIVE EMBODIMENTS

Figure 1:
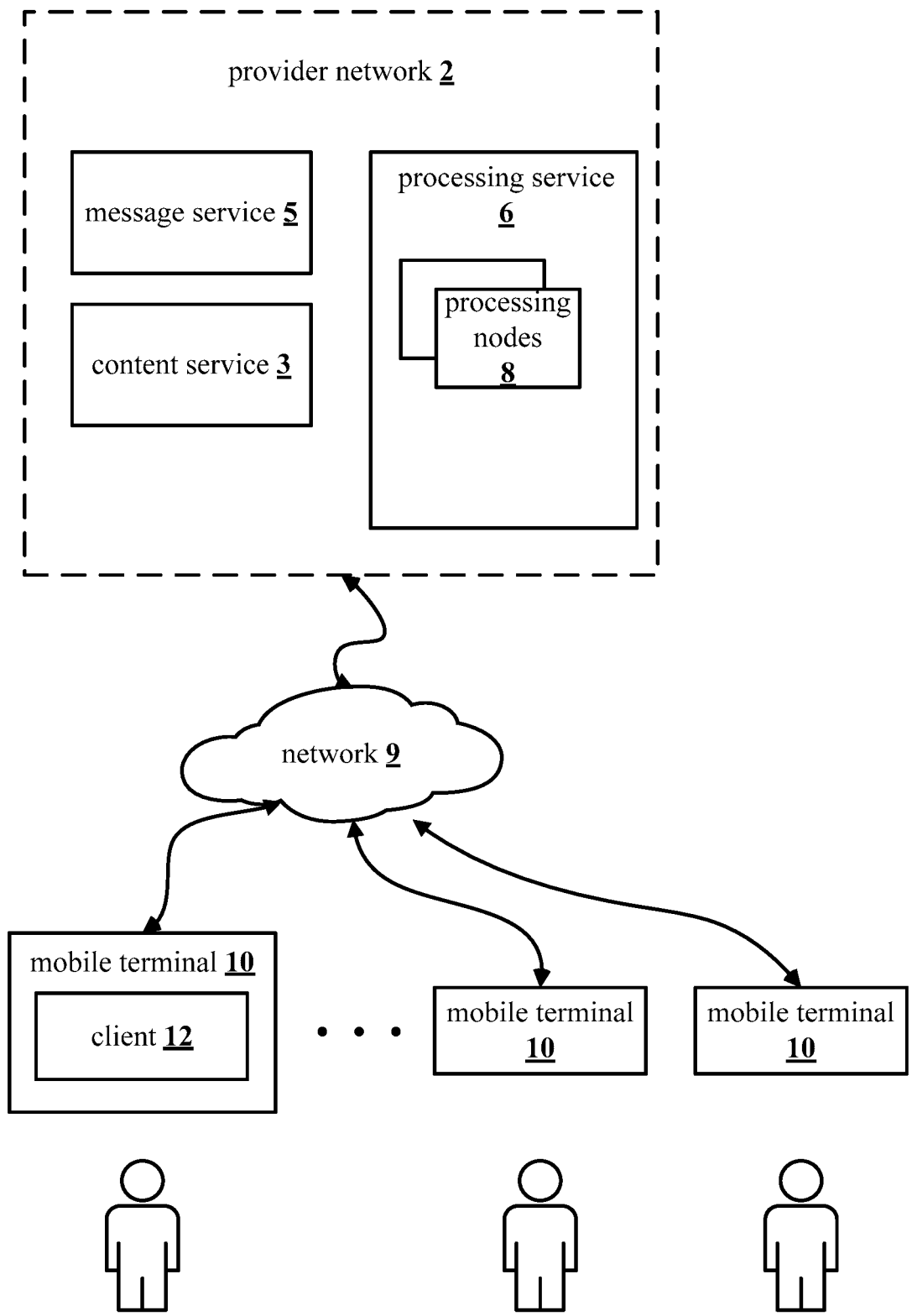
FIG. 1 schematically shows an application environment diagram of an interactive method of bullet screen easter eggs according to an embodiment of the present application.

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Bullet screen is a subtitle that pops up when watching a video through the Internet and moves in a predetermined direction. Based on the bullet screen function, viewers can post their own comments while watching the video, and will instantly display the comments that slide past when all viewers watch the video at that point in time, thereby increasing interactivity between viewers. At present, the bullet screen has become an important element for many viewers to watch videos and live broadcasts. It not only enables users to express their feelings about watching programs, but also enables users to watch other users' comments on programs, and realizes the interactivity of users when watching videos.

The inventor found that the bullet screen is displayed in text form. In some cases, the bullet screen may also be displayed in the form of bullet screen rich media (such as simple emoji pictures, character icons, flash animation effects). However, the above-mentioned display methods are too single, resulting in poor interaction effects; at the same time, the device performance in the era of excess performance is not fully utilized to optimize the bullet screen display effect and the efficiency of human-computer interaction.

The inventor overcomes the prejudice of those skilled in the art with multiple bullet screens and proposes generating a bullet screen easter egg that is a special bullet screen. The bullet screen easter egg comprises an interface element that may be a picture, the picture is formed by embedding the comment content in images, and the images are associated with the comment content. For example, a classic scene in a Lord of the Rings movie with an embedded text "Lord of the Rings". The interactive effect of the bullet screen easter egg is excellent. According to the characteristics of excess network bandwidth and excess equipment performance today, by making full use of these resources, the bullet screen in the existing technology (such as text bullet screen, simple emoji pictures, etc.) is replaced by bullet screen easter egg, which effectively improves the bullet screen display effect.

In addition, the inventors also found that those skilled in the art have a fixed cognition of functions of the bullet screen, that is, they are used to share the comment content of each user on a certain video segment among users. Even the bullet screen rich media (such as simple emoji pictures, character icons, flash animation effects), the essence of it is still the comment content, the comment content is only processed with some special effects or the comment content is only converted into simple symbols, which is still limited to exchange of comments between users.

The inventor overcomes the above-mentioned fixed cognition and finds that: the existing bullet screen has a single function, resulting in a waste of space resources on the screen. The function of the bullet screen is not only suitable for the exchange of comments between users, but also can be used to improve the interaction efficiency between the platform and the user, and the interaction efficiency between the mobile terminal and the user.

The following is explanations of some terms defined in the present application:

Bullet screen is a subtitle that pops up and moves in a predetermined direction when watching a video through the Internet, and is a pure communication message. The bullet screen has no fixed vocabulary in English. It is usually called: comment, danmaku, barrage, bullet screen, bullet-screen comment, etc. The bullet screen allows viewers to post comments or thoughts about the video, but it is different from ordinary video sharing sites that only display in the special comment area under the player, it will appear on the video image in real time by sliding subtitles, ensuring that all viewers can notice. Some bullet screen systems use scripting languages to provide specific forms of the bullet screen, such as appear or disappear the bullet screen at a specific position, control the pop-up speed of the bullet screen, and the position of the bullet screen. In addition, the bullet screen fixed to appear at the bottom or top of the screen will also be used as subtitles for non-localized videos without subtitles.

Bullet screen easter eggs are special bullet screens associated with comments and have certain surprises or unexpectedness or interactions. In some embodiments, the bullet screen easter egg comprises an interface element that may be a picture in which the comment content is embedded in the image content and the image content is associated with the comment content. In other embodiments, the bullet screen easter egg comprises an interface element that may be an object for providing interactive functions, such as a hyperlink, an interactive component, and so on. The "bullet screen easter egg" has no fixed vocabulary in English, and we can call the "bullet screen easter egg": comment egg, barrage egg, bullet screen egg, comment egg, barrage easter egg, easter egg, marvel fun, bonus scene, extra scene, cookie, etc.

FIG. 1 schematically shows a schematic diagram of an environmental application according to an embodiment of the present application.

A provider network 2 can connect multiple mobile terminals 10 through a network 9. In some embodiments, a content service 3 is provided by the provider network 2. In other embodiments, the content service 3 may be provided by an independent content provider connected to the provider network 2.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screens." In one example, bullet screens may be text bullet screens comprising comment content. In another example, bullet screens may be bullet screen easter eggs comprising interface elements. The interface elements may be interactive interface elements.

The provider network 2 may be located at a data center, such as a single premise, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links, and/or the like.

The provider network 2 may comprise a message service 5. The message service 5 may be configured to receive a plurality of messages. The plurality of messages may comprise a plurality of comment contents associated with content and information related to the plurality of comment contents.

The message service 5 may be configured to manage messages for various content items. Users may browse content and access different content items to view comments for particular content, such as comments submitted by other users for that particular content. Comments from users associated with a particular content item may be output to other users watching the particular content item. For example, all users accessing a content item (e.g., video clip) may view comments associated with the content item. Comment content that is input may be output in real-time or near-real-time.

The message service 5 may be configured to process the plurality of messages. The message service 5 may implement a queue or otherwise prioritize processing of the plurality messages based on information, e.g., timestamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be further configured to process a message by generating output data. The output data may comprise instructions for implementing outputting a comment or an interface element based on corresponding context. The output data may comprise application data for instructing an application to overlay the comment or the interface element based on the context. The output data may comprise instructions for generating (e.g., encoding) content corresponding to a comment or an interface element.

The output data may be used to generate (e.g., encode) output text bullet screens or the bullet screen easter eggs. The output text bullet screens or the bullet screen easter eggs may be combined (e.g., multiplexed) with original content items such as the content provided by the content service 3. The resulting combination may comprise content in a single package (e.g., container, transport container, transport stream), and can also comprise the original content item, the output text bullet screens or the bullet screen easter eggs.

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer-readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of mobile terminals 10 may be configured to access the content and the services of the provider network 2. The plurality of mobile terminals 10 may comprise any type of computing device, such as a mobile device, a tablet device, laptop, a computing station, a virtual reality headset, a gaming device, a set-top box, digital streaming device, a vehicle terminal, a smart TV, a set-top box, and so on.

The plurality of mobile terminals 10 may be associated with one or more users. A single user may use one or more of the plurality of mobile terminals 10 to access the provider network 2. The plurality of mobile terminals 10 may travel to a variety of locations and use different networks to access the provider network 2.

A mobile terminal 10 may comprise a client 12. The client 12 outputs (e.g., display, render, present) content to a user. The client 12 may be a video client (such as a bilibili client), a browser client, or a WeChat applet based on WeChat. The content may comprise videos, audio, text bullet screens bullet screen easter eggs, and/or the like. The text bullet screens can have different colors, sizes, animations, scrolling directions, and so on. The bullet screen easter eggs comprise interface elements that may be a picture with embedded text, an interactive component, or a hyperlink moving across content items, e.g., videos.

As an example, the client 12 may send reports against certain users to a processing service 6, and the client 12 may also send reviews about the reports to the processing service 6. The events or reviews sent from the plurality of mobile terminals 10 comprise reasons of submitting the events, content attributes associated with the events, user account information, and/or the like.

Embodiment 1

Figure 2:
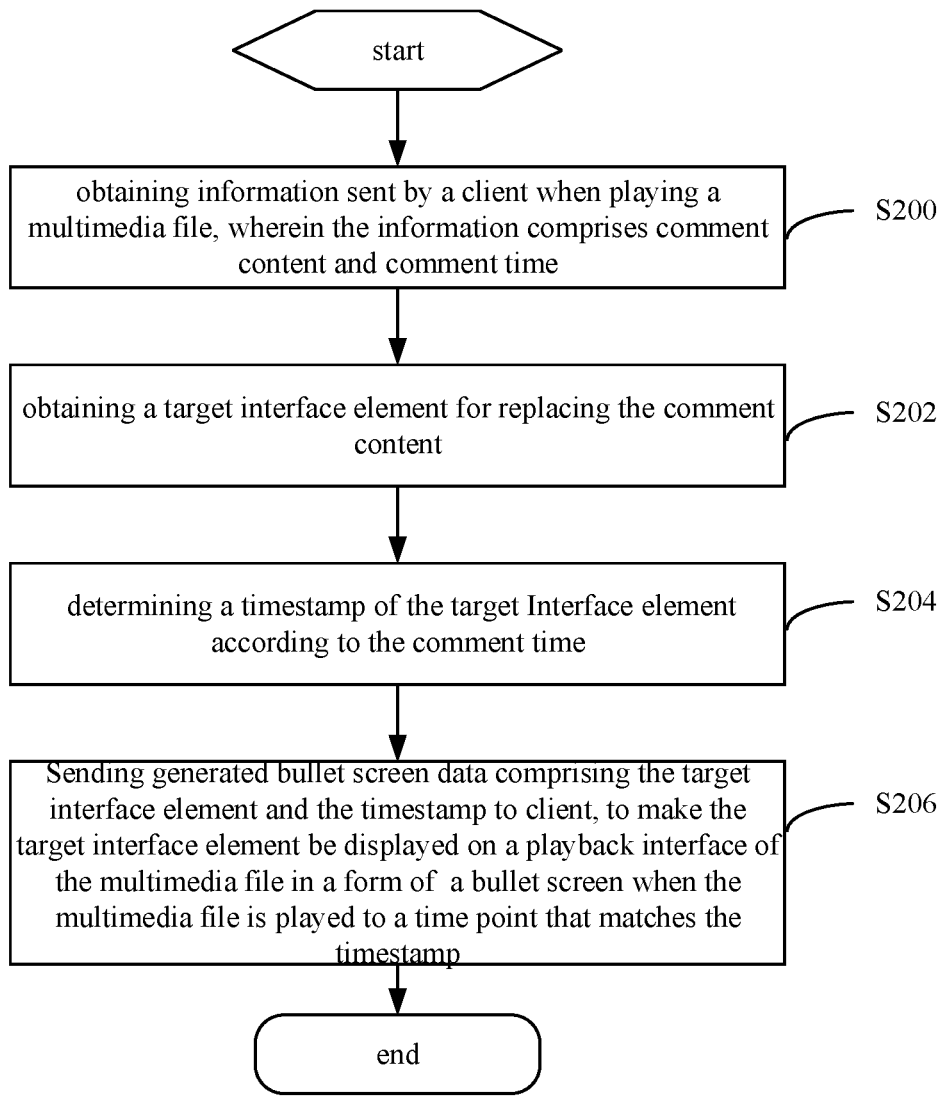
FIG. 2 schematically shows a flowchart of an interactive method of bullet screen easter eggs according to a first embodiment of the present application.

FIG. 2 schematically shows a flowchart of an interactive method of bullet screen easter eggs according to a first embodiment of the present application. It can be understood that the method embodiment can be executed in the provider network 2, and the flowchart of the method embodiment is not used to limit the order of execution steps.

As shown in FIG. 2, the interactive method of bullet screen easter eggs may include steps S200 to S206, wherein:

Step S200, obtaining information sent by the client 12 when playing a multimedia file, wherein the bullet screen information comprises comment content and comment time;

Step S202, obtaining a target interface element for replacing the comment content.

Step S204, determining bullet screen timestamp of the target interface element according to the comment time.

Step S206, generating bullet screen data comprising the target interface element and the timestamp, and send the generated bullet screen data to the client for display of the target interface element on a playing interface of the multimedia file in a form of a bullet screen when the multimedia file is played to a time point that matches the timestamp of the target interface element.

The client 12 is used to display or present the multimedia file to the user. The client 12 is also provided with an interface for inputting comment content. Through the interface, the user can comment on viewing the multimedia file, and send the bullet screen information including the comment content to the provider network 2 through the interface.

The provider network 2 receives the information comprising comment content, analyzes the information, and converts the comment content in the information into a corresponding target interface element. The target interface element is different from the comment content, but the target interface element has a certain association with the comment content. The generated bullet screen easter egg comprising the target interface element brings more surprises, unexpectedness, and interactive fun to the user.

Exemplarily, the bullet screen information may include comment content, comment time, account information (such as account ID) for posting the comment content, and so on.

Exemplarily, the target interface element maybe a picture with embedded comment content, for example, a classic picture in a Lord of the Rings movie with an embedded text "Lord of the Rings". Of course, if the classic picture contains the "Lord of the Rings" logo, the text "Lord of the Rings" can be omitted.

Exemplarily, the target interface element may be an interactive component, a hyperlink, or the like. The interactive component is used to provide an interactive entry between the client and the user; the hyperlink is used to provide a jump entry to other pages. For example, if the comment content in the target information is "Lord of the Rings", the target interface element can be the "Douban" movie review link of the "Lord of the Rings" movie or novel, the "Lord of the Rings" novel or other surrounding product purchase links, interactive components used to trigger screenshots of the classic "Lord of the Rings" scene, etc.

There are many ways to obtain the target interface element, and several ways are provided below.

Figure 3:
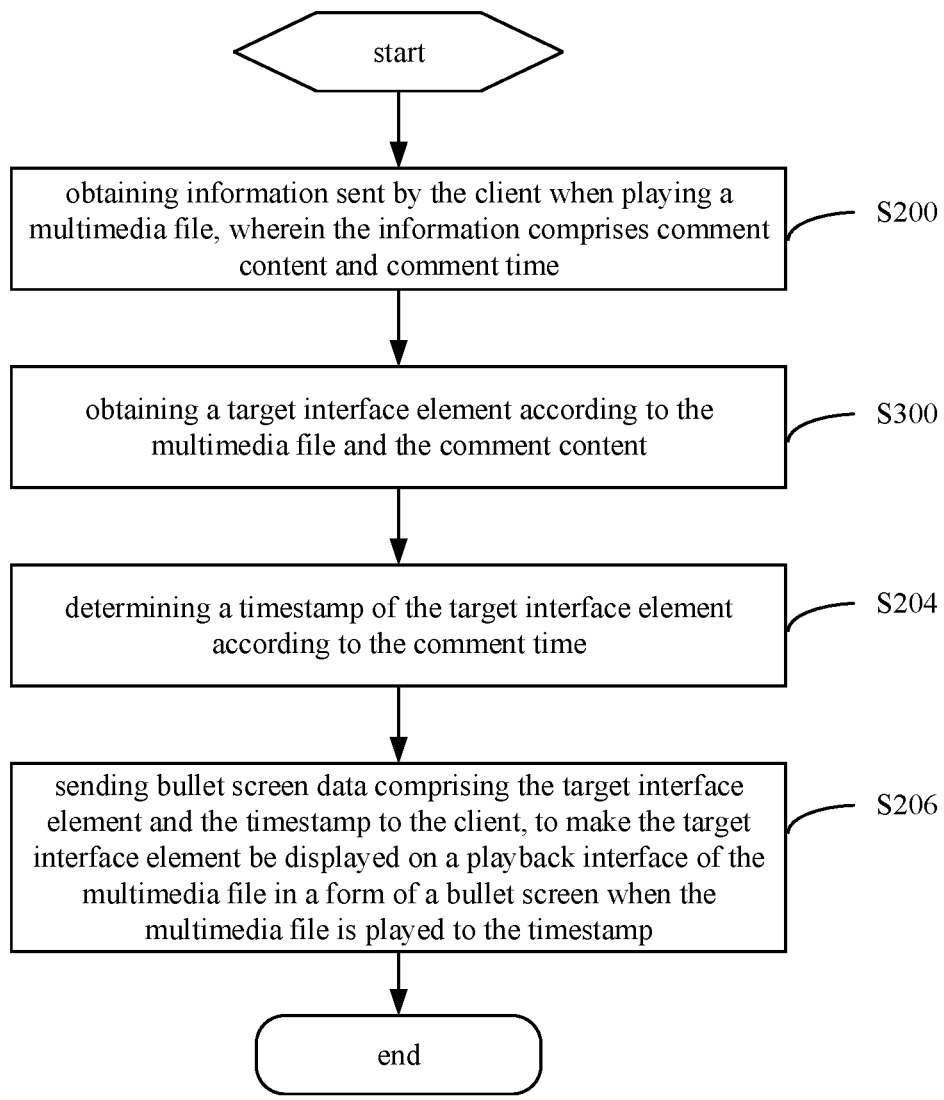
FIG. 3 schematically shows another flowchart of an interactive method of bullet screen easter eggs according to a first embodiment of the present application.

Method 1:

As shown in FIG. 3, the obtaining a target interface element for replacing the comment content can be implemented through step S300:

Step S300, obtaining the target interface element according to the multimedia file and the comment content.

The provider network 2 may pre-configure bullet screen easter egg configuration information applicable to the multimedia file:

(1) Multiple texts applicable to the multimedia file;

(2) Multiple bullet screen easter eggs applicable to the multimedia file; and (3) Mapping relationship between multiple texts and multiple bullet screen easter eggs applicable to the multimedia file.

For example, the multimedia file is "Astro Boy" cartoon. When the client 12 sends the comment content: "Astro Boy" while playing the cartoon, the provider network 2 can convert a discounted product link of "Astro Boy" peripheral products based on the cartoon and "Astro Boy", and take the discounted product link as the target interface element.

For example, the multimedia file is an in-interview program introducing Astro Boy cartoon. When the client 12 sends the comment content: "Astro Boy" while playing the cartoon, the provider network 2 can convert a movie comment link of "Astro Boy" based on the interview program and "Astro Boy", and take the movie comment link as the target interface element.

That is, if a user submits the same comment content for different multimedia files, the provider network 2 may convert the same comment content into different target interface elements. The target interface element obtained in this way is more compatible with the playback content of the multimedia file, and the integration of the target interface element and the playback content is improved, thereby further improving the user experience and enhancing the effective interaction based on the bullet screen easter egg. That is, the interaction efficiency is improved.

Method 2

Figure 4:
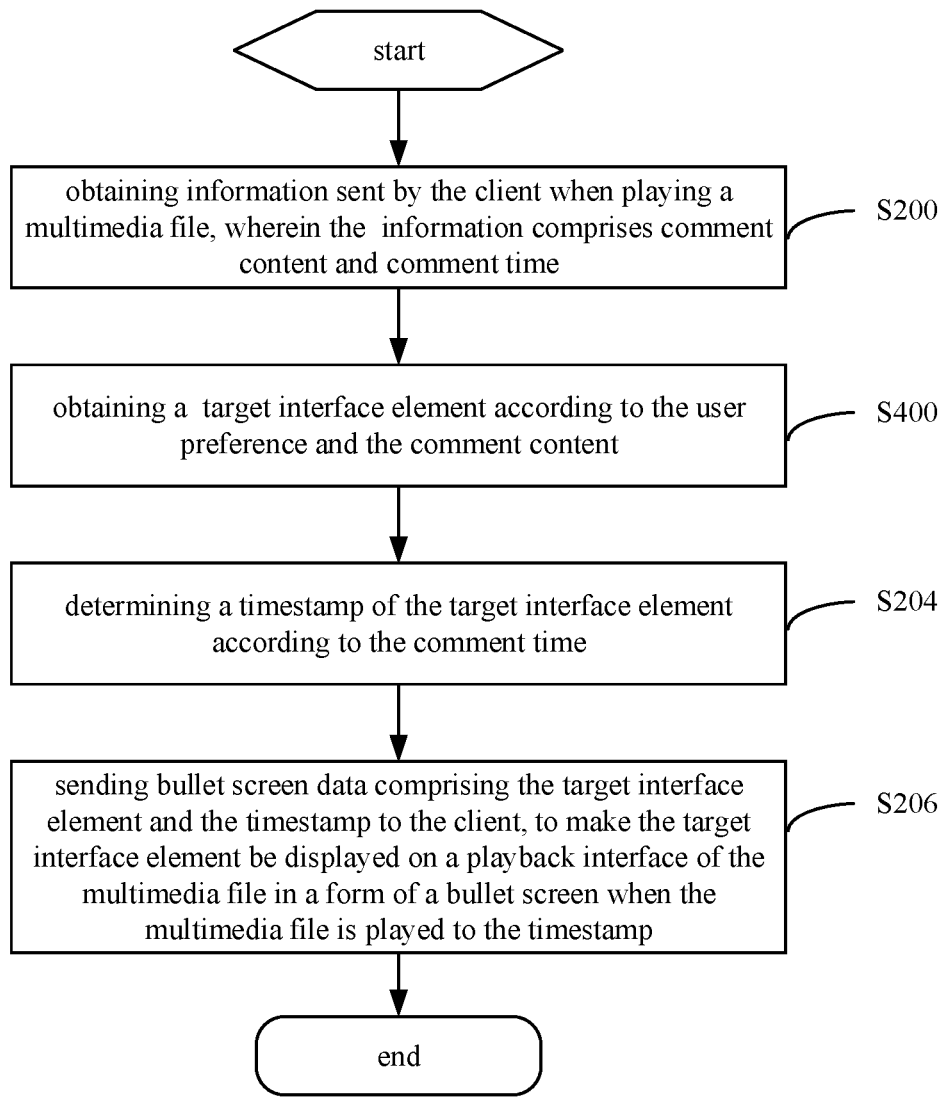
FIG. 4 schematically shows another flowchart of an interactive method of bullet screen easter eggs according to a first embodiment of the present application.

As shown in FIG. 4, the obtaining a target interface element for replacing the comment content can be implemented through step S400:

Step S400, obtaining the target interface element according to the user preference and the comment content.

The bullet screen information also includes account information, and the provider network 2 can obtain the user preference of the account according to the account information. The user preference of the account may be preference information previously filled in by the user in the account, or preference information obtained by pre-evaluating the account based on historical behavior information of the account.

For example, the user preferences of the account are: "like to thumb-up" and "dislike commercial advertisements". When the comment content can be converted into a target interface element of the "product hyperlink" type, the provider network 2 does not perform the egg conversion operation based on the user preference, and generates a text bullet screen for displaying the comment content. When the comment content can be converted into a target interface element of the "thumb-up component" type, the provider network 2 converts the comment content into a "thumb-up component" based on the user preference and takes the "thumb-up component" as the target interface element. The "thumb-up component" can be used to receive a user's click and respond to the click to make a thumb-up.

The provider network 2 can determine whether to convert the comment content into a target interface element according to the user preference. The provider network 2 can also convert the comment content into a corresponding target interface element according to the user preference. The target interface element obtained based on the user preferences improves the effective interaction between the target interface element and the user, that is, the interaction efficiency is improved.

Method 3

Figure 5:
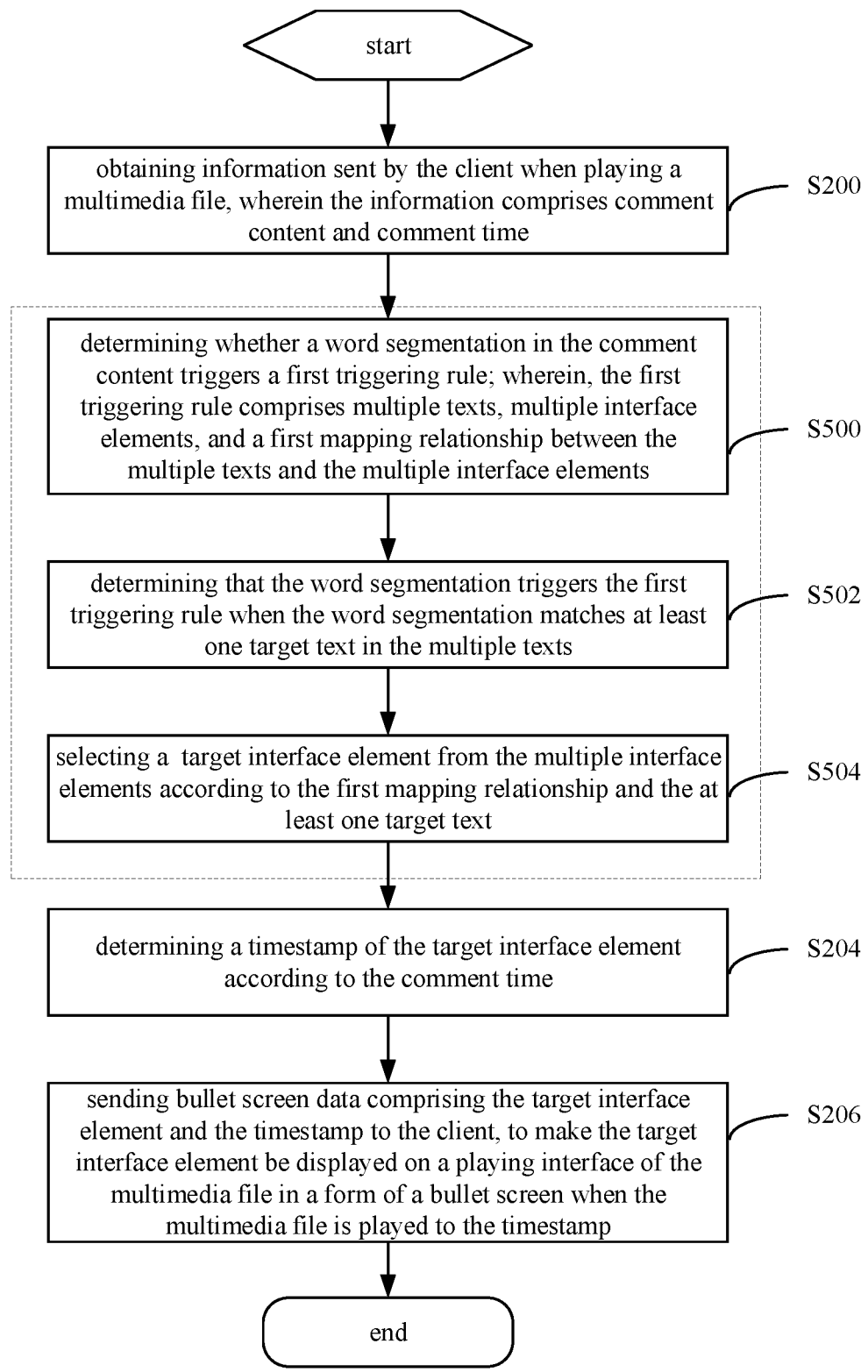
FIG. 5 schematically shows another flowchart of an interactive method of bullet screen easter eggs according to a first embodiment of the present application.

As shown in FIG. 5, the obtaining a target interface element for replacing the comment content can be implemented through step S500~S504:

Step S500, determining whether a word segmentation in the comment content triggers a first triggering rule; wherein, the first triggering rule comprises multiple texts, multiple bullet screen easter eggs, and a first mapping relationship between the multiple texts and the multiple bullet screen easter eggs. Step 502, determining that the word segmentation triggers the first triggering rule if the word segmentation matches at least one target text in the multiple texts. Step 504, selecting the target interface element from the multiple bullet screen easter eggs according to the first mapping relationship and the at least one target text.

It should be noted that if the word segmentation does not match any one of the multiple texts, it represents that the word segmentation cannot trigger the first triggering rule. In this case, the provider network 2 does not perform a bullet screen easter egg acquisition operation, and directly generates a text bullet screen for displaying the comment content, and provides the text bullet screen to all clients that are playing the multimedia file (including the client 12) for these clients to play the text bullet screen.

As an example, if the content comment is "Astro Boy is so brave", the provider network 2 will segment the "Astro Boy is so brave" to get "Astro Boy" and "so brave"/"brave", etc, and then match "Astro Boy" with the multiple texts, and match "so brave/brave" with the multiple texts. (1) If "Astro Boy" matches a text X1, the provider network 2 will obtain a bullet screen easter egg Y1 corresponding to the text X1, and use the bullet screen easter egg Y1 as the target interface element to replace the text comment "Astro Boy is so brave". (2) If "so brave/brave" matches a text X2, the provider network 2 will obtain a bullet screen easter egg Y2 corresponding to the text X2, and use the bullet screen easter egg Y2 as the target interface element to replace the text comment "Astro Boy is so brave". (3) If "Astro Boy" matches the text X1 and "so brave/brave" matches the text X2, the provider network 2 can perform the following operations: a. both the bullet screen easter egg Y1 and the bullet screen easter egg Y2 are used as the target interface element to replace the text comment "Astro Boy is so brave"; b. one of the bullet screen easter egg Y1 and bullet screen easter egg Y2 is randomly select as the target interface element; c. a priority of each bullet screen easter egg is preset, and the bullet screen easter egg with the higher priority is selected as the target interface element from the bullet screen easter egg Y1 and the bullet screen easter egg Y2 based on the priority of each bullet screen easter egg; d. importance of each participle in the comment content is confirmed according to the position and part of speech, etc of "Astro Boy", "so brave"/"brave" in the comment content, and the bullet screen easter egg corresponding to the segment with high importance is taken as the target interface element.

Through the above method 3, the provider network 2 can effectively match the target interface element based on the comment content, which improves the interaction efficiency based on the bullet screen easter egg. In addition, the efficiency of obtaining bullet screen easter eggs has also been effectively improved.

Method 4

Figure 6:
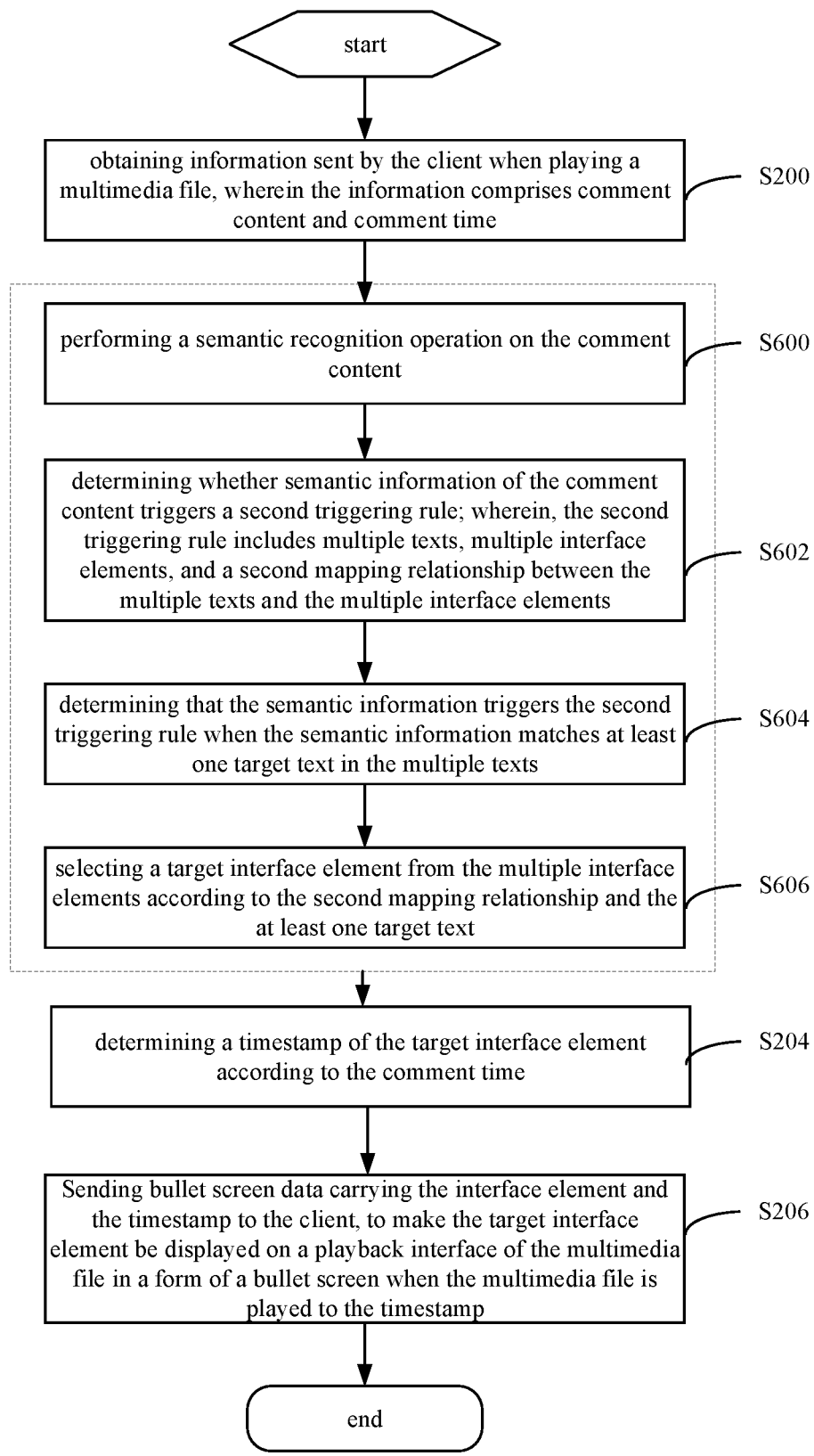
FIG. 6 schematically shows another flowchart of an interactive method of bullet screen easter eggs according to a first embodiment of the present application.

As shown in FIG. 6, the obtaining a target interface element for replacing the comment content can be implemented through step S600~S606:

Step S600, performing a semantic recognition operation according to the comment content. Step S602, determining whether semantic information of the comment content triggers a second triggering rule; wherein, the second triggering rule includes multiple texts, multiple bullet screen easter eggs, and a second mapping relationship between the multiple texts and the multiple bullet screen easter eggs. Step S604, determining that the semantic information triggers the second triggering rule if the semantic information matches at least one target text in the multiple texts. Step S606, selecting the target interface element from the multiple bullet screen easter eggs according to the second mapping relationship and the at least one target text.

It should be noted that if the semantic information does not match any one of the multiple texts, it represents that the word segmentation cannot trigger the second triggering rule. In this case, the provider network 2 does not perform a bullet screen easter egg acquisition operation, and directly generates a text bullet screen for displaying the comment content, and provides the text bullet screen to all clients that are playing the multimedia file (including the client 12) for these clients to play the text bullet screen.

Through the above method 4, the provider network 2 can obtain a bullet screen easter egg that more accurately matches the overall meaning of the comment content provided by the user, which improves the interaction efficiency based on the bullet screen easter egg. In addition, the efficiency of obtaining barrage eggs has also been effectively improved.

Method 5

Figure 7:
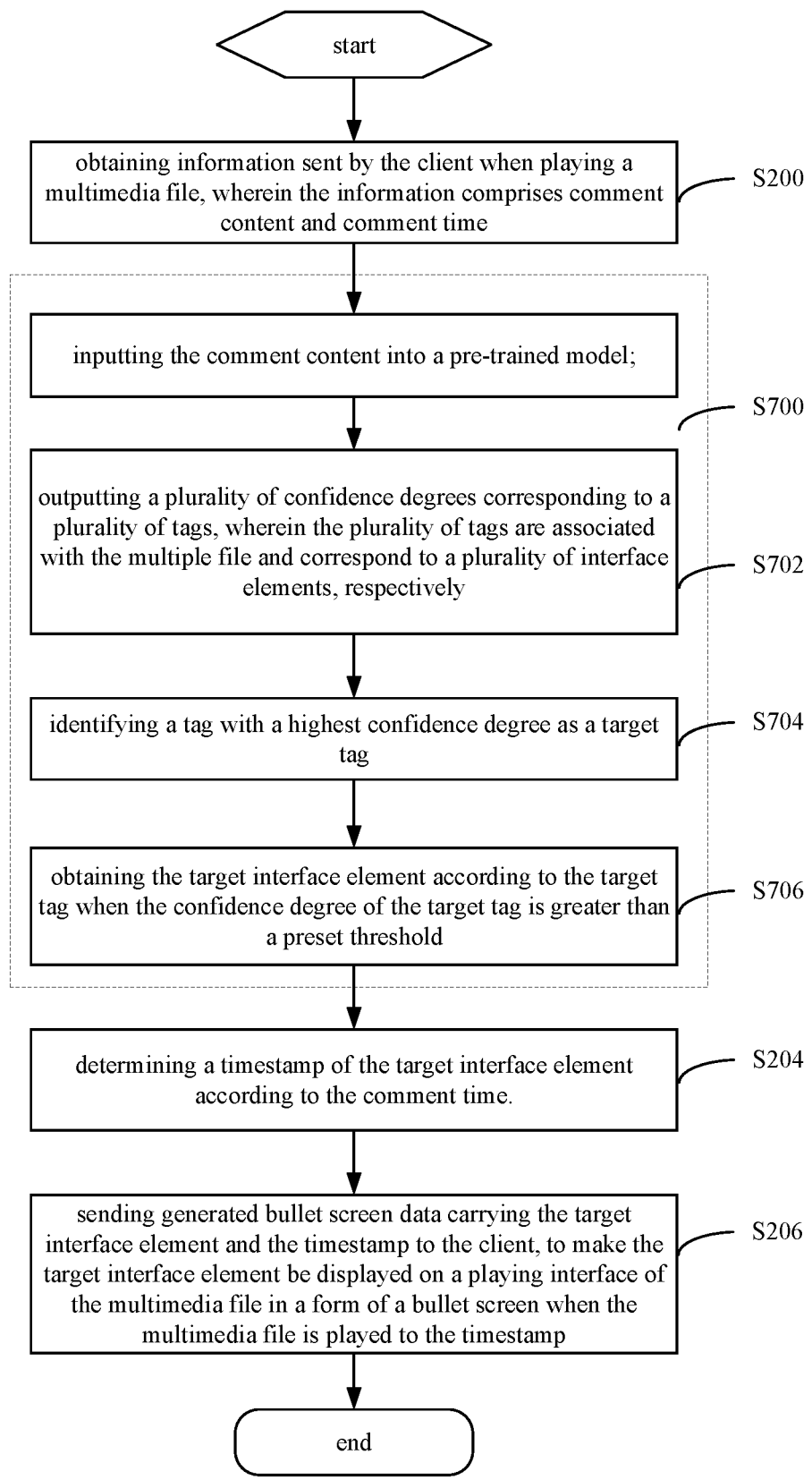
FIG. 7 schematically shows another flowchart of an interactive method of bullet screen easter eggs according to a first embodiment of the present application.

As shown in FIG. 7, the obtaining a target interface element for replacing the comment content can be implemented through step S700~S706:

Step S700, inputting the comment content into a bullet screen easter egg association model; wherein the bullet screen easter egg association model has multiple bullet screen easter egg tags associated with the multimedia file, and each bullet screen easter egg tag corresponds to a bullet screen easter egg. Step S702, outputting confidence degree of each bullet screen easter egg tag in the multiple bullet screen easter egg tags through the bullet screen easter egg association model. Step S704, determining a target interface element tag based on the bullet screen easter egg tag with a highest confidence degree. Step S706, obtaining the target interface element according to the target interface element tag if the confidence degree of the target interface element tag is greater than a preset threshold. The bullet screen easter egg association model may be a pre-trained network model, such as a deep neural network model, a long and short-term memory network model, etc.

It should be noted that if the confidence degree of the target interface element tag is not greater than the preset threshold, the provider network 2 does not perform the bullet screen easter egg acquisition operation, and directly generates a text bullet screen for displaying the comment content, and provides the text bullet screen to all clients that are playing the multimedia file (including the client 12) for these clients to play the text bullet screen.

Through the above method 5, the provider network 2 can obtain a bullet screen easter egg that more accurately matches the overall meaning of the comment content provided by the user, which improves the interaction efficiency based on the bullet screen easter egg. In addition, the efficiency of obtaining barrage eggs has also been effectively improved.

Method 6

Figure 8:
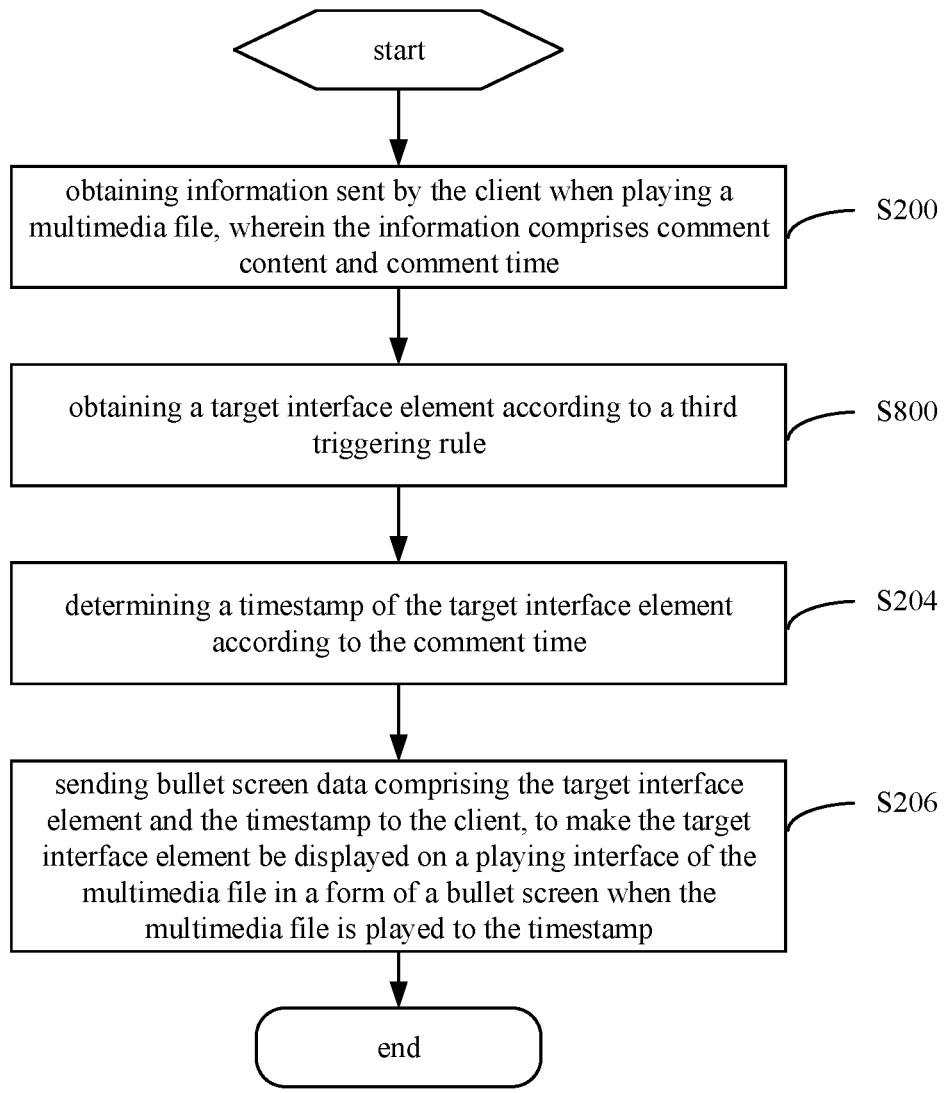
FIG. 8 schematically shows another flowchart of an interactive method of bullet screen easter eggs according to a first embodiment of the present application.

As shown in FIG. 8, the obtaining a target interface element for replacing the comment content can be implemented through step S800:

Step S800, obtaining the target interface element according to a third triggering rule.

Wherein, the third triggering rule is obtained by uploading by a content uploader through uploading a submission page; wherein, the third triggering rule is associated with the multimedia file, and the third triggering rule comprises multiple customized texts provided by the content uploader, multiple customized bullet screen easter eggs and a mapping relationship between the multiple customized texts and the multiple customized bullet screen easter eggs.

The provider network 2 can configure some custom functions, such as the custom function of the bullet screen easter egg. Exemplarily, the provider network 2 may open a custom interface for some high-level content uploaders (such as UP owners of millions of fans). Through the custom interface, these high-level content uploaders can customize some texts and bullet screen easter eggs that are strongly associated with the video or the high-level content uploaders themselves when uploading a video to form the third trigger rule.

Through the above method 6, the bullet screen easter eggs involved in each multimedia file are different, user visual fatigue caused by a large number of homogenized bullet screen easter eggs is avoided, and effective interaction between the target barrage eggs and the user is further ensured, which improves the efficiency of interaction.

The above provides several methods to obtain the target bullet method egg. It should be noted that the above methods are not used to limit the present application.

Figure 9:
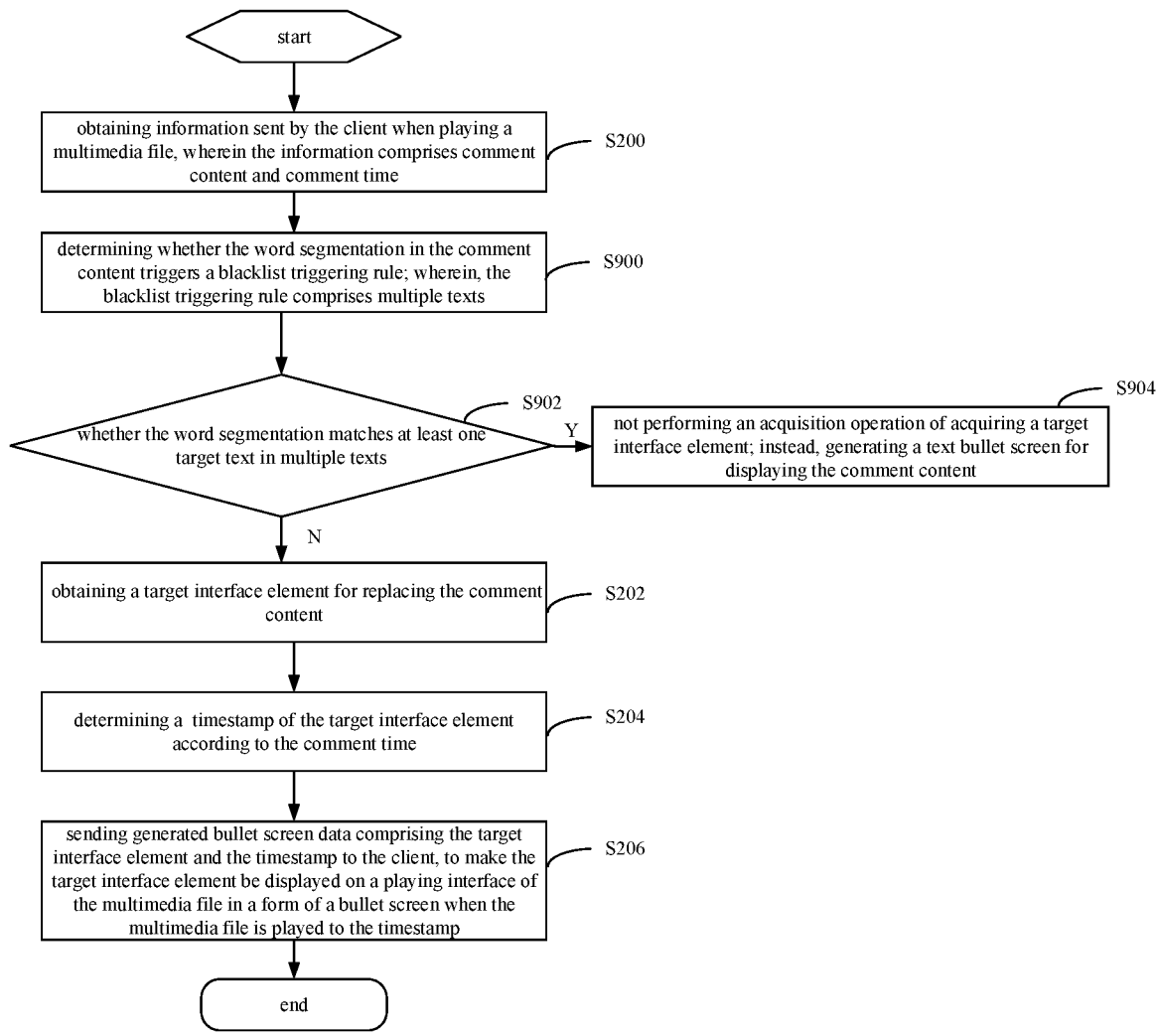
FIG. 9 schematically shows another flowchart of an interactive method of bullet screen easter eggs according to a first embodiment of the present application.

In order to avoid screen interference caused by multiple bullet screen easter eggs and client rendering pressure caused by multiple bullet screen easter eggs, the following solutions are provided:

In an exemplary embodiment, as shown in FIG. 9, the interactive method of the bullet screen easter eggs may further comprise steps S900 to S904: step S900, determining whether the word segmentation in the comment content triggers a blacklist triggering rule; wherein, the blacklist triggering rule comprises multiple texts. Step S902, determining that the word segmentation triggers the blacklist triggering rule if the word segmentation matches at least one target text in the multiple texts. Step S904, not performing a bullet screen easter egg acquisition operation and generating a text bullet screen for displaying the comment content according to the blacklist triggering rule. It should be noted that, if the word segmentation does not match any target text in the multiple texts, it represents that the word segmentation does not trigger the blacklist triggering rule. The provider network 2 obtains the target interface element.

Figure 10:
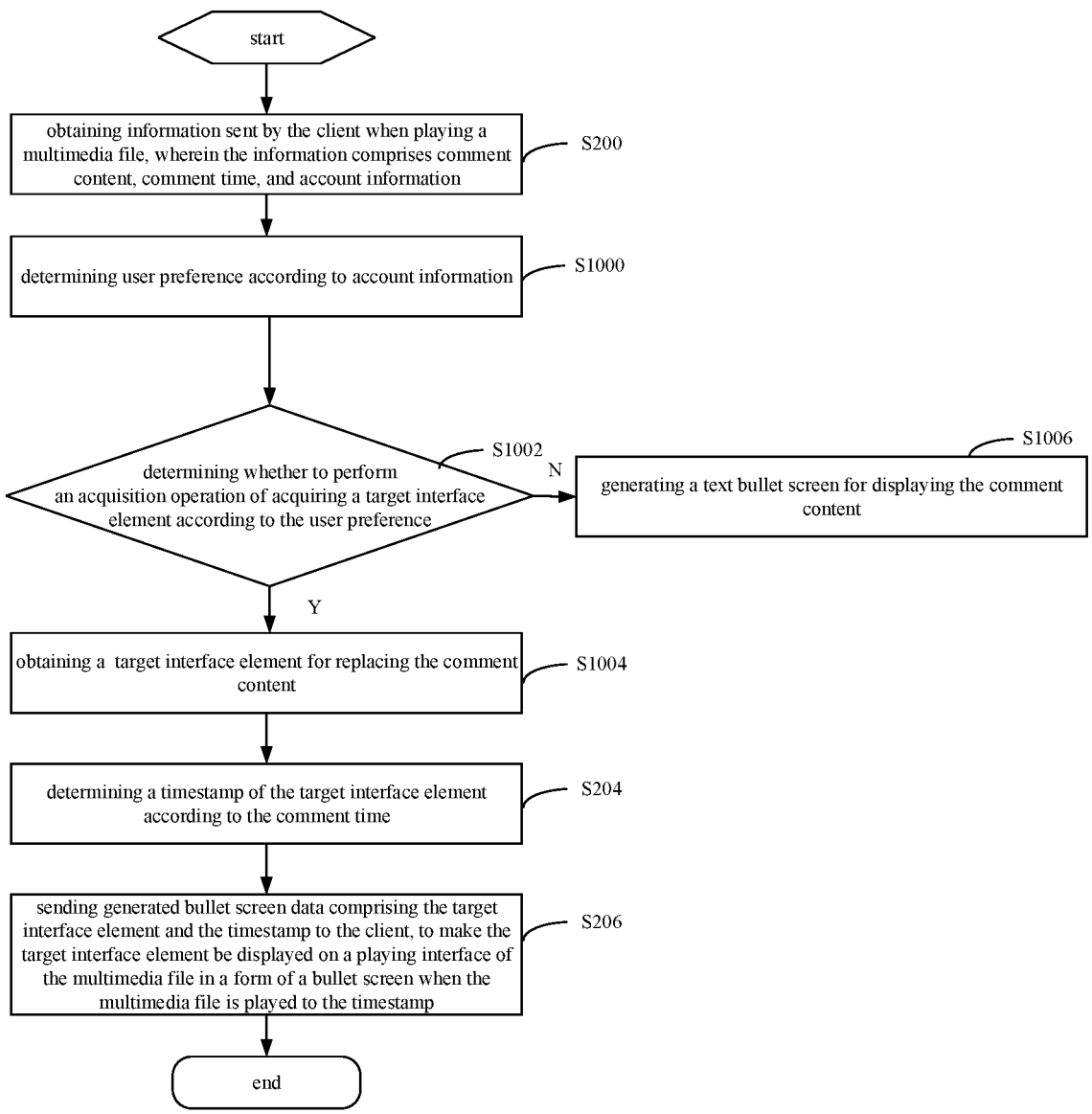
FIG. 10 schematically shows another flowchart of an interactive method of bullet screen easter eggs according to a first embodiment of the present application.

In an exemplary embodiment, as shown in FIG. 10, the obtaining a target interface element for replacing the comment content can comprise step S1000~S1006: step S1000, determining user preference according to account information. Step S1002, determining whether to perform a bullet screen easter egg acquisition operation according to the user preference. Step S1004, obtaining the target interface element if the bullet screen easter egg acquisition operation is determined to be performed. Step S1006, generating a text bullet screen for displaying the comment content if the bullet screen easter egg acquisition operation is determined not to be performed.

In an exemplary embodiment, the obtaining the target interface element if the bullet screen easter egg acquisition operation is determined to be performed, comprises: obtaining the target interface element according to the user preference and the comment content.

Figure 11:
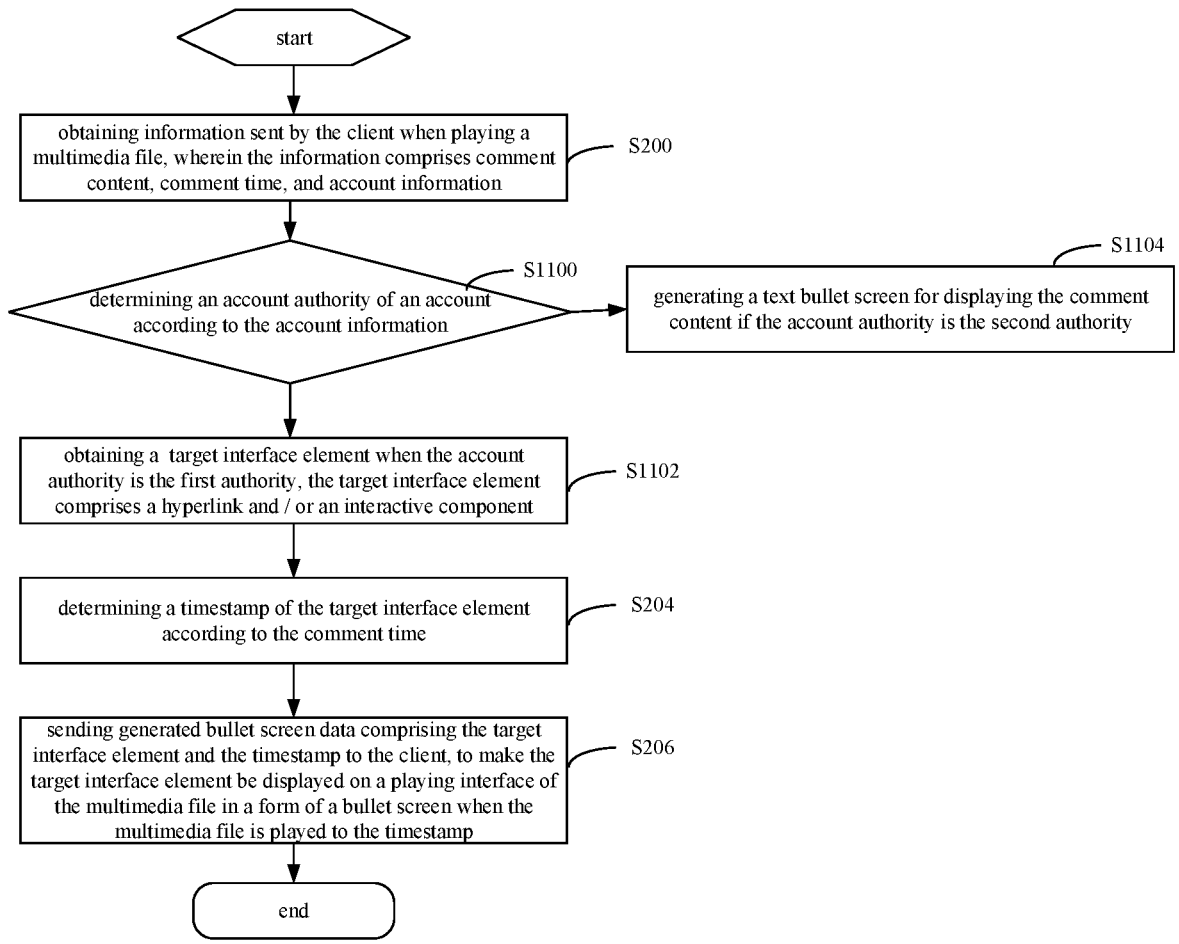
FIG. 11 schematically shows another flowchart of an interactive method of bullet screen easter eggs according to a first embodiment of the present application.

In an exemplary embodiment, as shown in FIG. 11, the obtaining a target interface element for replacing the comment content comprise step S1100, determining an account authority of an account according to the account information; wherein, the account authority comprises at least a first authority and a second authority, the first authority represents that the account has a launching authority of bullet screen easter eggs, the second authority represents that the account does not have the launching authority of bullet screen easter eggs; step S1102, obtaining the target interface element if the account authority is the first authority; step S1104, generating a text bullet screen for displaying the comment content if the account authority is the second authority.

For example, the target interface element can include or be associated with the following information:

{
  stime, // timestamp of the bullet screen launched in the multimedia file, in seconds
  size, // size of the target interface element
  object, // content of the bullet screen barrage egg (such as hyperlinks, interactive components, pictures embedded with comment content and the screen is associated with the comment content)
  duration, // duration of the target interface element
}

Figure 12:
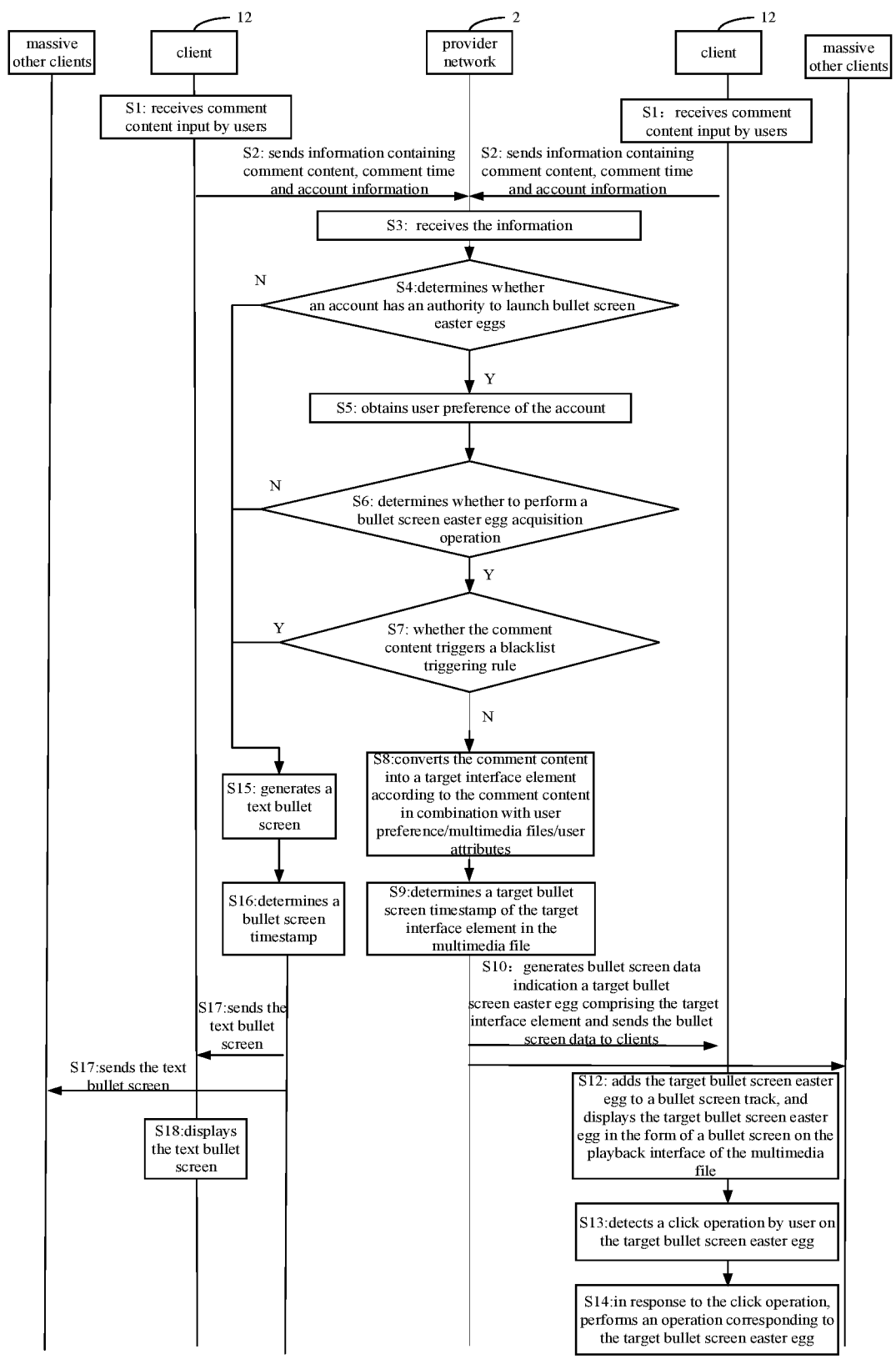
FIG. 12 schematically shows another flowchart of an interactive method of bullet screen easter eggs according to a first embodiment of the present application.

As shown in FIG. 12, a specific example to aid understanding is provided below.

It should be noted that, in order to make each process clearer, the two clients 12 in FIG. 12 refer to the same client.

S1: the client 12 receives comment content input by users through a bullet screen input box. The comment content comprises comments on a multimedia file (e.g., a video) given by the users.

S2: the client 12 sends data to the provider network 2, the data comprise information indicative of comment content, information indicative of comment time, and information indicative of a user account.

S3: the provider network 2 receives the data sent from the client 12.

S4: the provider network 2 determines whether a user account has the authority to launch bullet screen easter eggs based on corresponding account information.

When the user account has the authority to pop out the bullet screen easter eggs, then step S5 is entered.

When the user account does not have the authority to pop out the bullet screen easter eggs, then step S12 is entered.

S5: the provider network 2 obtains user preference based on the corresponding account information.

S6: the provider network 2 determines whether to perform a bullet screen easter egg acquisition operation according to the user preference.

When it is determined to perform the bullet screen easter egg acquisition operation, then step S7 is entered.

When it is determined not to perform the bullet screen easter egg acquisition operation, then step S15 is entered.

At S7: the provider network 2 determines whether the comment content triggers a blacklist triggering rule.

When the comment content triggers the blacklist triggering rule, then step S8 is entered.

When the comment content does not trigger the blacklist triggering rule, then step S15 is entered.

At S8: the provider network 2 converts the comment content into a target interface element based on comment content in combination with user preference, multimedia files, and/or user attributes.

The target interface element may be a play link of a cartoon of "Astro Boy", a product link of peripheral products of "Astro Boy", a follower component used to trigger attention to the uploader of "Astro Boy" video, or a collection component used to trigger a collection of "Astro Boy" video program, etc.

S9: the provider network 2 determines a timestamp of the target interface element in the multimedia file.

S10: the provider network 2 generates bullet screen data indicating a target bullet screen easter egg and comprising the target interface element as well as the timestamp, and sends the bullet screen data to all clients (including the client 12) that are playing the multimedia file.

S11: the client 12 receives the bullet screen data indicating the target bullet screen easter egg and comprising the target interface element and the timestamp.

S12: the client terminal 12 adds the target bullet screen easter egg to a bullet screen track, and displays the target bullet screen easter egg in the form of a bullet screen on the playback interface of the multimedia file.

"In the form of bullet screen" represents that the target bullet screen easter egg can be added to the bullet screen track of the bullet screen (that is, the target bullet screen easter egg and other text bullet screen have the same presentation rules, and are displayed sliding across the playback interface in a predetermined direction (for example, from right to left) in the bullet screen track.

S13: the client 12 detects a click operation by user on the target bullet screen easter egg; S14: in response to the click operation, the client 12 performs an operation corresponding to the target bullet screen easter egg (for example, a thumb-up operation, a page jump, an APP jump, etc.).

Figure 13:
FIG. 13 is a diagram of a playback interface showing the target bullet screen easter egg.

As shown in FIG. 13, the target bullet screen easter egg in the playback interface is "Your Name". When the client 12 detects that the user clicks on "Your Name", it will be able to jump to the playback page of "Your Name" to play the song.

Figure 14:
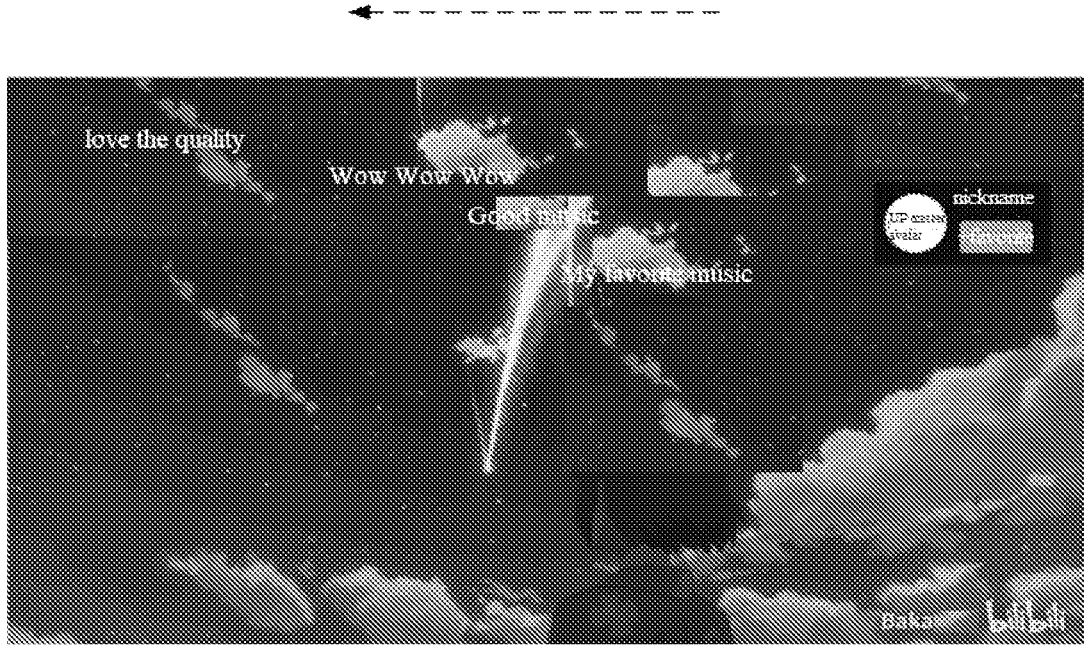
FIG. 14 is a diagram of another playback interface showing a target bullet screen easter egg.

As shown in FIG. 14, the target bullet screen easter egg in the playback interface is an interactive button used to follow a UP master (UP master, also known as video uploader). When the client 12 detects a click operation on the interactive button used to follow the UP master, a UP follow operation is performed. It can be seen that through the target bullet screen easter egg, the UP master can be followed and the human-computer interaction process is greatly optimized.

The dotted arrows in FIG. 13 and FIG. 14 indicate the movement direction of the target bullet screen easter egg and other text bullet screens in the playback interface.

S15: the provider network 2 generates a text bullet screen for displaying the comment content.

S16: the provider network 2 determines the timestamp of the target interface element in the multimedia file.

S17: the provider network 2 sends the text bullet screen with the bullet screen timestamp to all clients (including the client 12) that are playing the multimedia file.

S18: the client 12 adds the text bullet screen to the bullet screen track according to the bullet screen timestamp in the text bullet screen, and displays the text bullet screen in the form of a bullet screen in the playback interface of the multimedia file. The process ends.

The interactive method and system of bullet screen easter eggs, computing device, and computer-readable storage medium provided by the embodiments of the present application convert the comment content provided by a user into a target bullet screen easter egg with a certain surprise or unexpectedness or interaction. Different from pure exchange information between users, the target bullet screen easter egg comprises the target interface element that is a hyperlink or interactive component related to the comment content and is displayed on the playback interface in the form of a bullet screen, so that the target bullet screen easter egg realizes communications between users, and further improves the interaction efficiency between the platform and the user and the interaction efficiency between the mobile terminal and the user.

Specifically: the user can directly click on the target bullet screen easter egg to complete the corresponding operation (for example, thumb-up operation, favorite operation, hyperlink jump operation, etc.), which not only improves the convenience of interface interactive operations, but also increases interactive fun and immersion. The present application avoids various cumbersome interactive steps in the interactive operation between the user and the platform/mobile terminal (for example, need to exit the full-screen mode or partially emerge a designated interactive window/button, etc.), effectively improves the efficiency of interactive operation and the user experience.

Embodiment 2

Figure 15:
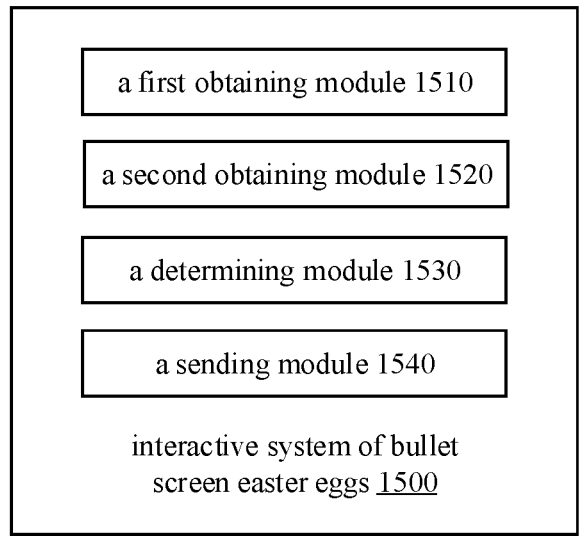
FIG. 15 schematically shows a block diagram of an interactive system of bullet screen easter eggs according to a second embodiment of the present application.

FIG. 15 schematically shows a block diagram of an interactive system of bullet screen easter eggs according to a second embodiment of the present application. The interactive system of bullet screen easter eggs may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 15, the interactive system 1500 of the bullet screen easter egg can comprise a first obtaining module 1510, a second obtaining module 1520, a determining module 1530, and a sending module 1540, wherein:

The first obtaining module 1510, obtaining information sent by a client when playing a multimedia file, wherein the bullet screen information comprises comment content and comment time.

The second obtaining module 1520, obtaining a target interface element for replacing the comment content;

The determining module 1530, determining bullet screen timestamp of the target interface element according to the comment time;

The sending module 1540, sending bullet screen data comprising the target interface element and the timestamp to the client, to make the target interface element be displayed on a playing interface of the multimedia file in a form of a bullet screen when the multimedia file is played to the bullet screen timestamp.

Optionally, the second obtaining module 1520, further obtaining the target interface element according to the multimedia file and the comment content.

Optionally, the bullet screen information further comprises account information; the second obtaining module 1520, determining user preference according to the account information; determining whether to perform a bullet screen easter egg acquisition operation according to the user preference; obtaining the target interface element if the bullet screen easter egg acquisition operation is determined to be performed; and generating a text bullet screen for displaying the comment content if the bullet screen easter egg acquisition operation is determined not to be performed.

Optionally, the second obtaining module 1520, obtaining the target interface element according to the user preference and the comment content.

Optionally, the second obtaining module 1520, determining whether a word segmentation in the comment content triggers a first triggering rule; wherein, the first triggering rule comprises multiple texts, multiple bullet screen easter eggs, and a mapping relationship between the multiple texts and the multiple bullet screen easter eggs; and determining that the word segmentation triggers the first triggering rule if the word segmentation matches at least one target text in the multiple texts; and selecting the target interface element from the multiple bullet screen easter eggs according to the at least one target text.

Optionally, the second obtaining module 1520, determining whether the word segmentation in the comment content triggers a blacklist triggering rule; wherein, the blacklist triggering rule comprises multiple texts; determining that the word segmentation triggers the blacklist triggering rule if the word segmentation matches at least one target text in the multiple texts; and not performing a bullet screen easter egg acquisition operation and generating a text bullet screen for displaying the comment content according to the blacklist triggering rule.

Optionally, the second obtaining module 1520, performing a semantic recognition operation according to the comment content; determining whether semantic information of the comment content triggers a second triggering rule; wherein, the second triggering rule includes multiple texts, multiple bullet screen easter eggs, and a mapping relationship between the multiple texts and the multiple bullet screen easter eggs; determining that the semantic information triggers the second triggering rule if the semantic information matches at least one target text in the multiple texts; and selecting the target interface element from the multiple bullet screen easter eggs according to the at least one target text.

Optionally, the second obtaining module 1520, inputting the comment content into a bullet screen easter egg association model; wherein the bullet screen easter egg association model has multiple bullet screen easter egg tags associated with the multimedia file, and each bullet screen easter egg tag corresponds to a bullet screen easter egg; outputting confidence degree of each bullet screen easter egg tag in the multiple bullet screen easter egg tags through the bullet screen easter egg association model; determining a target interface element tag based on the bullet screen easter egg tag with highest confidence degree; and obtaining the target interface element according to the target interface element tag if the confidence degree of the target interface element tag is greater than a preset threshold.

Optionally, the second obtaining module 1520, obtaining the target interface element according to a third triggering rule; wherein, the third triggering rule is obtained by uploading by a content uploader through uploading a submission page; wherein, the third triggering rule is associated with the multimedia file, and the third triggering rule comprises multiple customized texts provided by the content uploader, multiple customized bullet screen easter eggs and a mapping relationship between the multiple customized texts and the multiple customized bullet screen easter eggs.

Optionally, the bullet screen information further comprises account information; the second obtaining module 1520, determining an account authority of an account according to the account information; wherein, the account authority comprises at least a first authority and a second authority, the first authority represents that the account has a launching authority of bullet screen easter eggs, the second authority represents that the account does not have the launching authority of bullet screen easter eggs; obtaining the target interface element if the account authority is the first authority; and generating a text bullet screen for displaying the comment content if the account authority is the second authority.

Optionally, the target interface element comprises a picture with the comment content embedded in the screen content and the screen content is associated with the comment content.

Optionally, the target interface element comprises a hyperlink and/or an interactive component.

Embodiment 3

Figure 16:
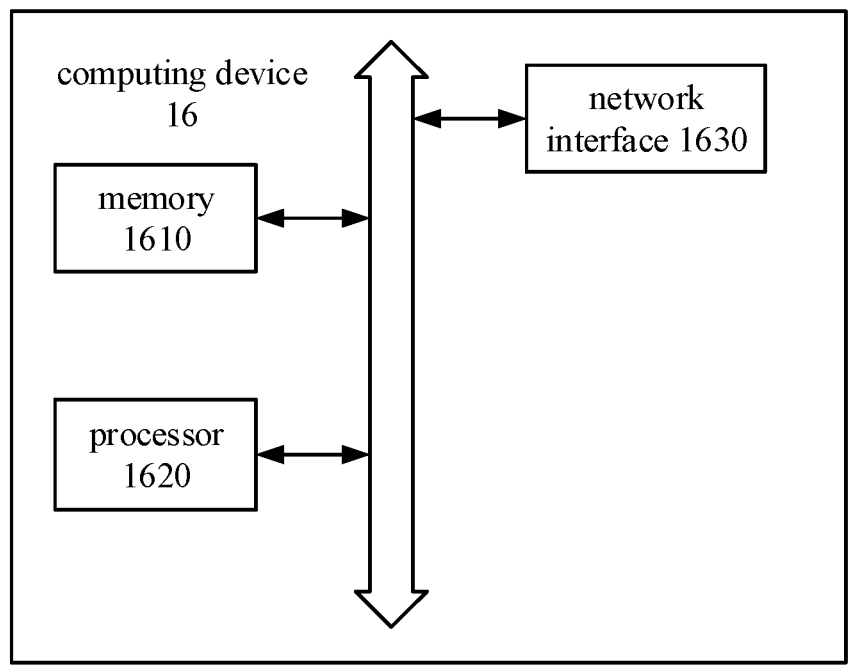
FIG. 16 schematically shows a schematic diagram of the hardware architecture of a computer device suitable for implementing an interactive method of bullet screen easter eggs according to a third embodiment of the present application.

FIG. 16 schematically shows a schematic diagram of the hardware architecture of a computer device suitable for implementing an interactive method of bullet screen easter eggs according to a third embodiment of the present application.

In the embodiment, a computing device 16 can be used as a component of the provider network 2 or constitute the provider network 2. The computing device 16 can be, for example, a virtual machine host process and one or more virtual machine instances, or a rack server or a blade server, tower server or cabinet server (including independent servers, or server clusters composed of multiple servers), etc.

In the embodiment, the computer device 16 can also be used as the mobile terminal 10 or a component of the mobile terminal 10. When the computer device 16 is the mobile terminal 10 or a component of the mobile terminal 10, the computer device 16 may be, for example, a smart phone, a computer, a projector, a set-top box, and the like.

In the embodiment, the computing device 16 is a device capable of automatically performing numerical calculations and/or information processing according to predefined or stored instructions. As shown in FIG. 16, the computing device 16 includes, but is not limited to, a memory 1610, a processor 1620, and a network interface 1630 that can be communicated with each other through a system bus. Of which:

The memory 1610 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 1610 may be an internal storage module of the computing device 16 such as a hard disk or memory of the computing device 16. In other embodiments, the memory 1610 may also be an external storage device of the computing device 16, such as a plugged hard disk provided on the computing device 16, a smart media card (SMC), secure digital (SD) card, a flash memory card, and the like. Of course, the memory 1610 may also include both an internal storage module and an external storage device of the computing device 16. In the embodiment, the memory 1610 is generally used to store an operating system and various types of application software installed in the computing device 16 such as program codes of the network communication method and the like. In addition, the memory 1610 may also be used to temporarily store various types of data that have been or will be outputted.

The processor 1620, in some embodiments, may be a central processing unit (CPU), a controller, a microprocessor, or other data processing chip. The processor 1620 is generally used to control the overall operation of the computing device 16 such as performing control and processing related to data interaction or communication with the computing device 16. In the embodiment, the processor 1620 is used to run program code stored in the memory 1610 or process data.

The network interface 1630 may include a wireless network interface or a wired network interface which is generally used to establish a communication connection between the computing device 16 and other computing devices. For example, the network interface 1630 is used for connecting the computing device 16 to an external terminal via a network and establishing a data transmission channel and a communication connection between the computing device 16 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 16 shows only a computing device 16 having components 1610-1630, but it is understood that it is not required to implement all of the shown components and that more or fewer parts can be implemented in lieu thereof.

In the embodiment, an interactive method of bullet screen easter eggs stored in the memory 1610 may be divided into one or more program modules and executed by one or more processors (processor 1620 in the embodiment) to complete the present application.

Embodiment 4

The embodiment further provides a computer-readable storage medium, which stores computer programs, and when the computer programs are executed by a processor, the steps of an interactive method of bullet screen easter eggs in the embodiment are realized.

In the embodiment, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the computer-readable storage medium may be an internal storage module of the computing device such as a hard disk or memory of the computing device. In other embodiments, the memory may also be an external storage device of the computing device, such as a plugged hard disk provided on the computing device, a smart media card (SMC), secure digital (SD) card, a flash memory card, and the like. Of course, the computer-readable storage medium may also include both an internal storage module and an external storage device of the computing device. In the embodiment, the computer-readable storage medium is generally used to store an operating system and various types of application software installed in the computing device such as program codes of the network communication method and the like. In addition, the memory may also be used to temporarily store various types of data that have been or will be outputted.

Embodiment 5

Figure 17:
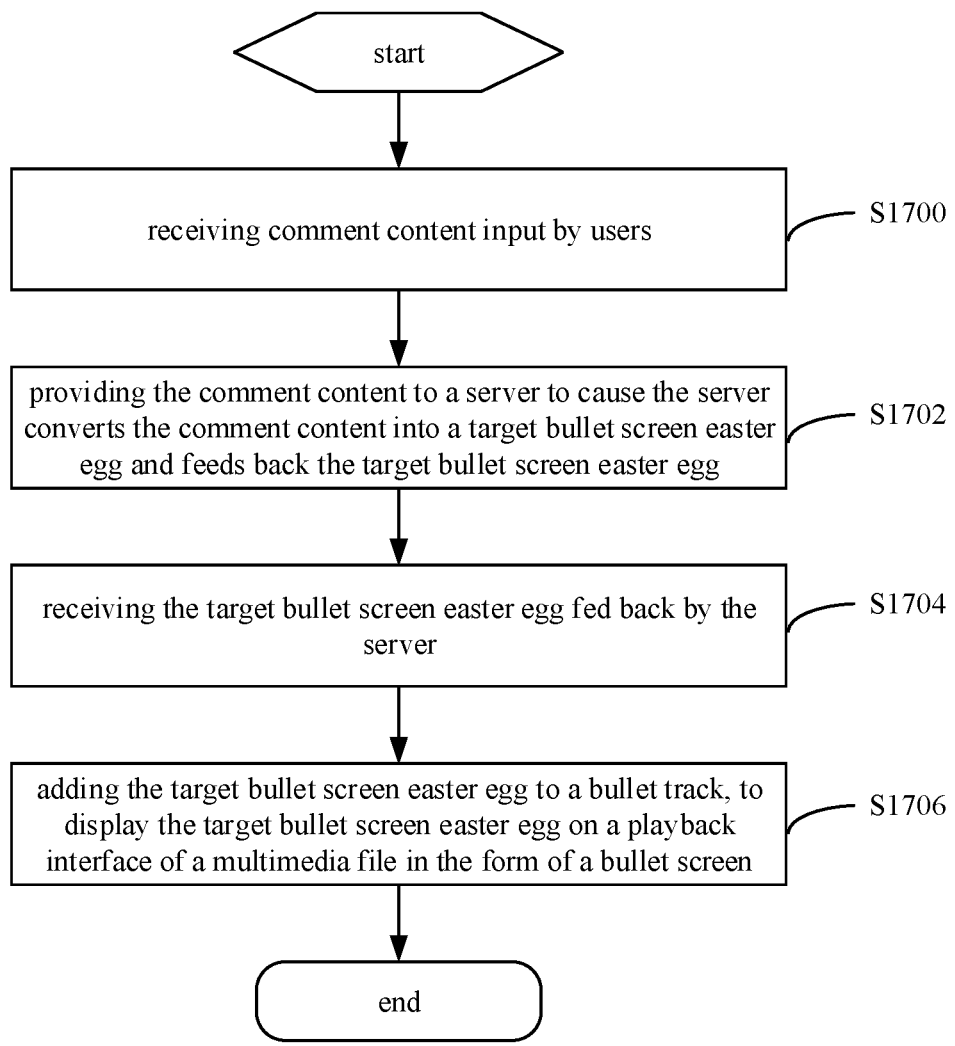
FIG. 17 schematically shows a flowchart of an interactive method of bullet screen easter eggs according to a fifth embodiment of the present application.

FIG. 17 schematically shows a flowchart of interactive method of bullet screen easter eggs according to a fifth embodiment of the present application. It can be understood that the embodiment of the method may be executed in the mobile terminal 10, and the flowchart of the embodiment of the method is not used to limit the order of execution steps.

As shown in FIG. 17, the interactive method of bullet screen easter eggs may comprise steps S1700 to S1708, wherein:

Step S1700, receiving comment content input by users.

Step S1702, providing the comment content to a server to cause the server converts the comment content into a target bullet screen easter egg and feeds back the target bullet screen easter egg.

Step S1704, receiving the target bullet screen easter egg fed back by the server.

Step S1706, adding the target bullet screen easter egg to a bullet track, to display the target bullet screen easter egg on a playback interface of a multimedia file in the form of a bullet screen.

In an exemplary embodiment, the target bullet screen easter egg comprises a picture with the comment content embedded in the screen content and the screen content is associated with the comment content.

In an exemplary embodiment, the target bullet screen easter egg comprises a hyperlink and/or an interactive component.

Figure 18:
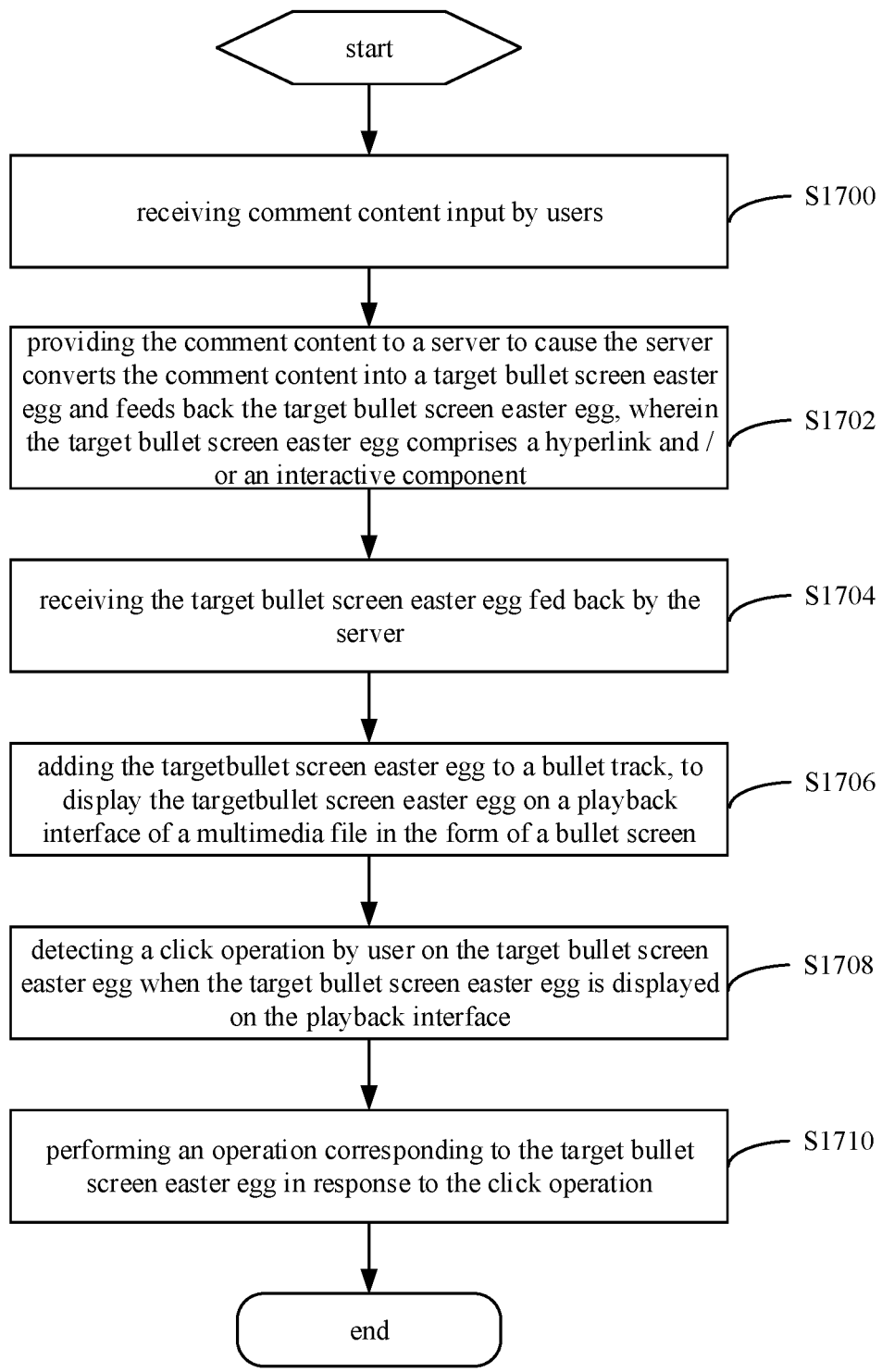
FIG. 18 schematically shows another flowchart of an interactive method of bullet screen easter eggs according to a fifth embodiment of the present application.

In an exemplary embodiment, as shown in FIG. 18, the interactive method of bullet screen easter eggs also comprises: Step S1708, detecting a click operation by a user on the target bullet screen easter egg when the target bullet screen easter egg is displayed on the playback interface.

Step S1710, performing an operation corresponding to the target bullet screen easter egg in response to the click operation.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
obtaining data sent from a client computing device while the client computing device is playing a multimedia file, wherein the data comprise information indicative of comment content and comment time, and wherein the comment content is comment text input via an interface;
determining a target interface element based on the multimedia file and analyzing the comment text, wherein the target interface element comprises a picture, the picture is formed by embedding the comment content in an image, and the image is associated with the comment content;
determining a timestamp of the target interface element based on the comment time;
generating bullet screen data, the bullet screen data comprising the target interface element and the timestamp; and
sending bullet screen data to the client computing device for displaying the target interface element in a form of a bullet screen on a playback interface of the multimedia file when the multimedia file is played to a time point that matches the timestamp of the target interface element, wherein the target interface element is animated by scrolling a position of the target interface element on the playback interface when displayed on the playback interface of the multimedia file.

2. The method of claim 1, wherein the data sent from the client computing device further comprise information indicative of a user account, and wherein the method further comprises:
determining a user preference based on the information indicative of the user account;
determining whether an acquisition operation for acquiring the target interface element is performed based on the user preference; and
generating a text bullet screen for displaying the comment content in response to a determination that the acquisition operation is not performed.

3. The method of claim 1, further comprising:
determining whether a word segmentation in the comment content triggers a first rule, wherein the first rule comprises a first plurality of texts, a first plurality of interface elements, and a first mapping relationship between the first plurality of texts and the first plurality of interface elements; and
determining that the word segmentation triggers the first rule based on determining that the word segmentation matches at least one text among the plurality of texts; and
selecting the target interface element from the plurality of interface elements based on the at least one text and the first mapping relationship.

4. The method of claim 1, further comprising:
determining whether a word segmentation in the comment content triggers a blacklist rule based on determining whether the word segmentation matches at least one text among a plurality of texts included in the blacklist rule;
determining whether an acquisition operation for acquiring the target interface element is to be performed based on determining whether the word segmentation triggers the blacklist rule;
in response to a determination that the word segmentation triggers the blacklist rule, determining not to perform the acquisition operation; and
in response to the determination that the word segmentation triggers the blacklist rule, generating a text bullet screen for displaying the comment content.

5. The method of claim 1, further comprising:
performing a semantic recognition operation on the comment content to obtain semantic information of the comment content;
determining whether the semantic information of the comment content triggers a second rule, wherein the second rule comprises a second plurality of texts, a second plurality of interface elements, and a second mapping relationship between the second plurality of texts and the second plurality of interface elements;

determining that the semantic information triggers the second rule based on determining that the semantic information matches at least one text among the second plurality of texts; and selecting the target interface element from the second plurality of interface elements based on the at least one text and the second mapping relationship.

6. The method of claim 1, further comprising:

inputting the information indicative of the comment content into a trained model;

outputting a plurality of confidence degrees Corresponding to a plurality of tags from the trained model, wherein the plurality of tags are associated with the multimedia file and correspond to a plurality of interface elements, respectively;

identifying a tag with a highest confidence degree among the plurality of tags as a target tag; and obtaining the target interface element based on the target tag in response to a determination that the confidence degree of the target tag is greater than a predetermined threshold.

7. The method of claim 1, further comprising:

obtaining a third rule, the third rule being uploaded by a content uploader through a submission interface, wherein the third rule is associated with the multimedia file, and wherein the third rule comprises a third plurality of customized texts, a third plurality of customized interface elements, and a third mapping relationship between the third plurality of customized texts and the third plurality of customized interface elements; and determining the target interface element based at least in part on the third rule.

8. The method of claim 1, wherein the data sent from the client computing device further comprise information indicative of a user account, and wherein the method further comprises:

determining an authority of the user account based on the information indicative of the user account, wherein there are a plurality of authorities comprising a first authority and a second authority, the first authority represents that a corresponding user account has a authority of launching interface elements, and the second authority represents that the corresponding user account does not have the authority of launching the interface elements;

obtaining the target interface element in response to a first determination that the user account has the first authority; and generating a text bullet screen for displaying the comment content in response to a second determination that the user account has the second authority.

9. The method of claim 1, wherein the target interface element comprises at least one of a hyperlink or an interactive component.

10. A system, comprising:

at least one processor; and at least one memory communicatively coupled to the at least one processor and storing instructions that upon execution by the at least one processor cause the system to perform operations, the operations comprising:

obtaining data sent from a client computing device while the client computing device is playing a multimedia file, wherein the data comprise information indicative of comment content and comment time, and wherein the comment content is comment text input via an interface;

determining a target interface element based on the multimedia file and analyzing the comment text, wherein the target interface element comprises a picture, the picture is formed by embedding the comment content in an image, and the image is associated with the comment content;

determining a timestamp of the target interface element based on the comment time;

generating bullet screen data, the bullet screen data comprising the target interface element and the timestamp; and sending bullet screen data to the client computing device for displaying the target interface element in a form of a bullet screen on a playback interface of the multimedia file when the multimedia file is played to a time point that matches the timestamp of the target interface element, wherein the target interface element is animated by scrolling a position of when the target interface element on the playback interface displayed on the playback interface of the multimedia file.

11. The system of claim 10, the operations further comprising:

determining whether a word segmentation in the comment content triggers a first rule, wherein the first rule comprises a first plurality of texts, a first plurality of interface elements, and a first mapping relationship between the first plurality of texts and the first plurality of interface elements; and determining that the word segmentation triggers the first rule based on determining that the word segmentation matches at least one text among the plurality of texts; and selecting the target interface element from the plurality of interface elements based on the at least one text and the first mapping relationship.

12. The system of claim 10, the operations further comprising:

performing a semantic recognition operation on the comment content to obtain semantic information of the comment content;

determining whether the semantic information of the comment content triggers a second rule, wherein the second rule comprises a second plurality of texts, a second plurality of interface elements, and a second mapping relationship between the second plurality of texts and the second plurality of interface elements;

determining that the semantic information triggers the second rule based on determining that the semantic information matches at least one text among the second plurality of texts; and selecting the target interface element from the second plurality of interface elements based on the at least one text and the second mapping relationship.

13. The system of claim 10, the operations further comprising:

obtaining a third rule, the third rule being uploaded by a content uploader through a submission interface, wherein the third rule is associated with the multimedia file, and wherein the third rule comprises a third plurality of customized texts, a third plurality of customized interface elements, and a third mapping relationship between the third plurality of customized texts and the third plurality of customized interface elements; and determining the target interface element based at least in part on the third rule.

14. The system of claim 10, the operations further comprising:
- inputting the information indicative of the comment content into a trained model;
- outputting a plurality of confidence degrees Corresponding to a plurality of tags from the trained model, wherein the plurality of tags are associated with the multimedia file and correspond to a plurality of interface elements, respectively;
- identifying a tag with a highest confidence degree among the plurality of tags as a target tag; and
- obtaining the target interface element based on the target tag in response to a determination that the confidence degree of the target tag is greater than a predetermined threshold.

15. The system of claim 10, wherein the data sent from the client computing device further comprise information indicative of a user account, and wherein the operations further comprising:
- determining a user preference based on the information indicative of the user account;
- determining an authority of the user account based on the information indicative of the user account, wherein there are a plurality of authorities comprising a first authority and a second authority, the first authority represents that a corresponding user account has a authority of launching interface elements, and the second authority represents that the corresponding user account does not have the authority of launching the interface elements; and
- determining whether an acquisition operation for acquiring the target interface element is performed based on the user preference or the authority of the user account.

16. The system of claim 10, wherein the target interface element comprises at least one of a hyperlink or an interactive component.

17. A non-transitory computer-readable storage medium, storing computer-readable instructions that upon execution by a processor cause the processor to implement operations comprising:
- obtaining data sent from a client computing device while the client computing device is playing a multimedia file, wherein the data comprise information indicative of comment content and comment time, and wherein the comment content is comment text input via an interface;
- determining a target interface element based on the multimedia file and analyzing the comment text, wherein the target interface element comprises a picture, the picture is formed by embedding the comment content in an image, and the image is associated with the comment content;
- determining a timestamp of the target interface element based on the comment time;
- generating bullet screen data, the bullet screen data comprising the target interface element and the timestamp; and
- sending bullet screen data to the client computing device for displaying the target interface element in a form of a bullet screen on a playback interface of the multimedia file when the multimedia file is played to a time point that matches the timestamp of the target interface element, wherein the target interface element is animated by scrolling a position of the target interface element on the playback interface when displayed on the playback interface of the multimedia file.

18. The non-transitory computer-readable storage medium of claim 17, the operations further comprising:
- determining whether a word segmentation in the comment content triggers a first rule, wherein the first rule comprises a first plurality of texts, a first plurality of interface elements, and a first mapping relationship between the first plurality of texts and the first plurality of interface elements; and
- determining that the word segmentation triggers the first rule based on determining that the word segmentation matches at least one text among the plurality of texts; and
- selecting the target interface element from the plurality of interface elements based on the at least one text and the first mapping relationship.

19. The non-transitory computer-readable storage medium of claim 17, the operations further comprising:
- performing a semantic recognition operation on the comment content to obtain semantic information of the comment content;
- determining whether the semantic information of the comment content triggers a second rule, wherein the second rule comprises a second plurality of texts, a second plurality of interface elements, and a second mapping relationship between the second plurality of texts and the second plurality of interface elements;
- determining that the semantic information triggers the second rule based on determining that the semantic information matches at least one text among the second plurality of texts; and
- selecting the target interface element from the second plurality of interface elements based on the at least one text and the second mapping relationship.

20. The non-transitory computer-readable storage medium of claim 17, the operations further comprising:
- obtaining a third rule, the third rule being uploaded by a content uploader through a submission interface, wherein the third rule is associated with the multimedia file, and wherein the third rule comprises a third plurality of customized texts, a third plurality of customized interface elements, and a third mapping relationship between the third plurality of customized texts and the third plurality of customized interface elements; and
- determining the target interface element based at least in part on the third rule.

* * * * *